United States Patent
Merrill et al.

(10) Patent No.: US 8,792,165 B2
(45) Date of Patent: Jul. 29, 2014

(54) INTERNALLY PATTERNED MULTILAYER OPTICAL FILMS WITH MULTIPLE BIREFRINGENT LAYERS

(75) Inventors: William Ward Merrill, White Bear Lake, MN (US); Douglas S. Dunn, Maplewood, MN (US); Stephen A. Johnson, Woodbury, MN (US); David T. Yust, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 183 days.

(21) Appl. No.: 13/139,856

(22) PCT Filed: Dec. 22, 2009

(86) PCT No.: PCT/US2009/069160
§ 371 (c)(1),
(2), (4) Date: Jun. 15, 2011

(87) PCT Pub. No.: WO2010/075363
PCT Pub. Date: Jul. 1, 2010

(65) Prior Publication Data
US 2011/0249334 A1      Oct. 13, 2011

Related U.S. Application Data

(60) Provisional application No. 61/139,736, filed on Dec. 22, 2008, provisional application No. 61/157,996, filed on Mar. 6, 2009, provisional application No. 61/158,006, filed on Mar. 6, 2009.

(51) Int. Cl.
*G02B 5/30* (2006.01)
(52) U.S. Cl.
USPC .................. 359/489.19; 359/489.01

(58) Field of Classification Search
None
See application file for complete search history.

(56) References Cited

U.S. PATENT DOCUMENTS 3,610,729 A    10/1971  Rogers
4,417,948 A    11/1983  Mayne-Banton et al.
(Continued)

FOREIGN PATENT DOCUMENTS

EP    0976529    2/2000
GB    2328180    2/1999
(Continued)

OTHER PUBLICATIONS

TSAI, "Fabricating Polymeric Micro-retardation Arrays for Autostereoscopic Display System by $CO_2$ Laser Heat Processing Technology", Stereoscopic Displays and Virtual Reality Systems VII, Proceedings of SPIE, May 3, 2000, vol. 3957, pp. 142-152.

(Continued)

*Primary Examiner* — Stephone B Allen
*Assistant Examiner* — Jyotsna Dabbi
(74) *Attorney, Agent, or Firm* — Yufeng Dong; James A. Baker; Gregory D. Allen

(57) ABSTRACT

A reflective film includes interior layers that selectively reflect light by constructive or destructive interference, the layers extending from a first to a second zone of the film. The interior layers include a first set of layers composed of a first material and a second set of layers composed of a different second material. The first and second sets of layers are both birefringent in the first zone, but at least some of the layers have reduced birefringence in the second zone. The reduced birefringence produces a second reflective characteristic in the second zone that differs from a first reflective characteristic in the first zone, this difference not being substantially attributable to any thickness difference between the first and second zones. The film may also incorporate absorbing agents to assist in the manufacture or processing of the film.

15 Claims, 9 Drawing Sheets

(56) References Cited

U.S. PATENT DOCUMENTS

| | | | |
|---|---|---|---|
| 4,446,305 A | 5/1984 | Rogers et al. | |
| 4,551,819 A | 11/1985 | Michl et al. | |
| 4,568,632 A | 2/1986 | Blum et al. | |
| 4,822,451 A | 4/1989 | Ouderkirk et al. | |
| 4,864,537 A | 9/1989 | Michl et al. | |
| 4,879,176 A | 11/1989 | Ouderkirk et al. | |
| 4,902,378 A | 2/1990 | Ouderkirk et al. | |
| 5,103,337 A | 4/1992 | Schrenk et al. | |
| 5,302,259 A | 4/1994 | Birngruber | |
| 5,360,659 A | 11/1994 | Arends et al. | |
| 5,389,324 A | 2/1995 | Lewis et al. | |
| 5,486,949 A | 1/1996 | Schrenk et al. | |
| 5,527,650 A | 6/1996 | Yoshinaga et al. | |
| 5,633,123 A | 5/1997 | Hill et al. | |
| 5,706,131 A | 1/1998 | Ichimura | |
| 5,757,016 A | 5/1998 | Dunn et al. | |
| 5,808,798 A | 9/1998 | Weber et al. | |
| 5,882,774 A | 3/1999 | Jonza et al. | |
| 5,926,241 A | 7/1999 | Gunning, III | |
| 6,045,894 A | 4/2000 | Jonza et al. | |
| 6,099,758 A | 8/2000 | Verall et al. | |
| 6,157,490 A | 12/2000 | Wheatley et al. | |
| 6,179,948 B1 | 1/2001 | Merrill et al. | |
| 6,207,260 B1 | 3/2001 | Wheatley et al. | |
| 6,252,710 B1 * | 6/2001 | Fan et al. | 359/489.07 |
| 6,268,961 B1 | 7/2001 | Nevitt et al. | |
| 6,352,761 B1 | 3/2002 | Hebrink et al. | |
| 6,368,699 B1 | 4/2002 | Gilbert et al. | |
| 6,372,309 B1 | 4/2002 | Claussen | |
| 6,449,093 B2 | 9/2002 | Hebrink et al. | |
| 6,498,679 B2 | 12/2002 | Lee et al. | |
| 6,531,230 B1 | 3/2003 | Weber et al. | |
| 6,590,707 B1 * | 7/2003 | Weber | 359/361 |
| 6,628,877 B2 | 9/2003 | Dugan et al. | |
| 6,693,657 B2 | 2/2004 | Carroll, Jr. et al. | |
| 6,783,349 B2 | 8/2004 | Neavin et al. | |
| 6,788,463 B2 | 9/2004 | Merrill et al. | |
| 6,830,713 B2 | 12/2004 | Hebrink et al. | |
| 6,852,203 B1 | 2/2005 | Kawakami | |
| 6,939,499 B2 | 9/2005 | Merrill et al. | |
| 6,949,212 B2 | 9/2005 | Merrill et al. | |
| 6,977,774 B1 | 12/2005 | Kawakami | |
| 7,064,897 B2 | 6/2006 | Hebrink | |
| 7,187,396 B2 | 3/2007 | Carroll, Jr. et al. | |
| 7,316,558 B2 | 1/2008 | Merrill et al. | |
| 7,396,493 B2 | 7/2008 | Tait | |
| 7,435,357 B2 | 10/2008 | Harding | |
| 8,297,522 B2 | 10/2012 | Umemoto | |
| 2002/0154406 A1 | 10/2002 | Merrill et al. | |
| 2003/0178609 A1 | 9/2003 | Hammond-Smith et al. | |
| 2004/0008298 A1 | 1/2004 | Kwok et al. | |
| 2004/0051875 A1 | 3/2004 | Mi et al. | |
| 2006/0126066 A1 | 6/2006 | Kawakami | |
| 2006/0285210 A1 * | 12/2006 | Hebrink et al. | 359/584 |
| 2007/0047261 A1 | 3/2007 | Thompson et al. | |
| 2008/0003419 A1 | 1/2008 | Hebrink et al. | |
| 2008/0143926 A1 * | 6/2008 | Amimori et al. | 349/75 |
| 2008/0174848 A1 | 7/2008 | Kim et al. | |
| 2008/0241733 A1 | 10/2008 | Wright et al. | |
| 2009/0219603 A1 * | 9/2009 | Xue | 359/288 |
| 2009/0273836 A1 | 11/2009 | Yust et al. | |
| 2011/0121557 A1 | 5/2011 | Wu et al. | |

FOREIGN PATENT DOCUMENTS

| | | |
|---|---|---|
| JP | 08334618 | 12/1996 |
| JP | 09183287 | 7/1997 |
| JP | 2000-242748 | 9/2000 |
| JP | 2001-051122 | 2/2001 |
| JP | 2001-256531 | 9/2001 |
| JP | 2002048915 | 2/2002 |
| JP | 2005-017430 | 1/2005 |
| JP | 2007-086720 | 4/2007 |
| WO | WO 97/36195 | 10/1997 |
| WO | WO 02/084343 | 10/2002 |
| WO | WO 2006/110402 | 10/2006 |
| WO | WO 2007/084000 | 7/2007 |
| WO | WO 2008/144136 | 11/2008 |
| WO | WO 2008/144656 | 11/2008 |
| WO | WO 2009/093718 | 7/2009 |
| WO | WO 2009/140088 | 11/2009 |
| WO | WO 2010/075340 | 7/2010 |
| WO | WO 2010/075357 | 7/2010 |
| WO | WO 2010/075373 | 7/2010 |
| WO | WO 2010/075383 | 7/2010 |

OTHER PUBLICATIONS

3M Security Solutions Brochure, "3M™ Color Shifting Authentication Products", 2 pgs, Feb. 28, 2008.

Tsai et al., "Fabricating Microretarders by $CO_2$ Laser Heating Process Technology", Opt. Eng., Nov. 2001, vol. 40, No. 11, pp. 2577-2581.

International Search Report for PCT/US2009/069160, Mar. 1, 2010.

Written Opinion for PCT/US2009/069160, Mar. 1, 2010.

U.S. Appl. No. 13/139,826; Inventors: William W. Merrill and Douglas S. Dunn and Travis L. Potts; Filed: Dec. 22, 2009.

U.S. Appl. No. 13/139,838; Inventors: William W. Merrill, Douglas S. Dunn; Filed: Dec. 22, 2009.

U.S. Appl. No. 13/139,848; Inventors: William W. Merrill, Douglas S. Dunn, and Przemyslaw P. Markowicz; Filed: Dec. 22, 2009.

U.S. Appl. No. 13/139,866; Inventors: William W. Merrill and Douglas S. Dunn; Filed Dec. 22, 2009.

* cited by examiner

INTERNALLY PATTERNED MULTILAYER OPTICAL FILMS WITH MULTIPLE BIREFRINGENT LAYERS

CROSS REFERENCE TO RELATED APPLICATIONS

This application claims the benefit of U.S. Provisional Application No. 61/139,736, "Internally Patterned Multilayer Optical Films Using Spatially Selective Birefringence Reduction", filed Dec. 22, 2008, and U.S. Provisional Application No. 61/157,996, "Multilayer Optical Films Having Side-by-Side Mirror/Polarizer Zones", filed Mar. 6, 2009, and U.S. Provisional Application No. 61/158,006, "Multilayer Optical Films Suitable for Bi-Level Internal Patterning", filed Mar. 6, 2009, the disclosures of which are incorporated herein by reference.

FIELD OF THE INVENTION

This invention relates generally to optical films, with particular application to such films whose reflection characteristics are determined in large part by constructive and destructive interference of light reflected from interfaces between layers disposed within the film, i.e., internal to the film. The invention also relates to associated systems and methods.

BACKGROUND

Multilayer optical films, i.e., films that contain a multiplicity of distinct layers of different refractive index and of suitable thicknesses to selectively reflect and transmit light as a result of constructive and destructive interference of light reflected at the interfaces between the layers, are known. In some cases, such films are formed by vacuum depositing alternating layers of a high refractive index inorganic material, such as titanium dioxide, and a low refractive index inorganic material, such as silicon dioxide, onto a glass substrate or other rigid substrate.

In other cases, such films are formed by coextruding different organic polymer materials in an alternating layer arrangement through a die, cooling the extrudate to form a cast web, and stretching the cast web in order to thin the web to a suitable final thickness. In some cases the stretching may also be carried out in such a way as to cause one or both of the alternating polymer materials to become birefringent, i.e., wherein a given material has a refractive index for light polarized along one direction that differs from a refractive index for light polarized along a different direction. This birefringence may result in the finished film having a large refractive index mismatch between adjacent layers along a first in-plane direction (sometimes referred to as an x-axis), and a substantial refractive index match between adjacent layers along a second in-plane direction (sometimes referred to as a y-axis), whereupon normally incident light polarized along the first direction is highly reflected and normally incident light polarized along the second direction is highly transmitted. See, e.g., U.S. Pat. No. 3,610,729 (Rogers), U.S. Pat. No. 4,446,305 (Rogers et al.), and U.S. Pat. No. 5,486,949 (Schrenk et al.). The birefringence may also result in a refractive index difference between adjacent layers along an out-of-plane direction (i.e., along an axis perpendicular to the film) that differs significantly from a refractive index difference between adjacent layers along one or both in-plane directions. An example of this latter situation is a film having substantially the same large refractive index mismatch between adjacent layers along both orthogonal in-plane directions (x and y), such that normally incident light of any polarization is highly reflected, but where the refractive indices of adjacent layers along the out-of-plane direction (z) are substantially matched, such that the reflectivity of the interfaces for so-called "p-polarized" light (light polarized in the plane of incidence) is substantially constant. See, e.g., U.S. Pat. No. 5,882,774 (Jonza et al.). Jonza et al. teach, among other things, how a z-axis mismatch in refractive index between adjacent microlayers, more briefly termed the z-index mismatch or $\Delta n_z$, can be tailored to allow the construction of multilayer stacks for which the Brewster angle—the angle at which reflectance of p-polarized light at an interface goes to zero—is very large or is nonexistent. This in turn allows for the construction of multilayer mirrors and polarizers whose interfacial reflectivity for p-polarized light decreases slowly with increasing angle of incidence, or is independent of angle of incidence, or increases with angle of incidence away from the normal direction. As a result, multilayer films having high reflectivity for both s-polarized light (light polarized perpendicular to the plane of incidence) and p-polarized light for any incident direction in the case of mirrors, and for the selected direction in the case of polarizers, over a wide bandwidth, can be achieved.

It is also known to impart a pattern to multilayer optical films to form indicia. See, e.g., U.S. Pat. No. 6,045,894 (Jonza et al.) "Clear to Colored Security Film", U.S. Pat. No. 6,531,230 (Weber et al.) "Color Shifting Film", and U.S. Pat. No. 6,788,463 (Merrill et al.) "Post-Formable Multilayer Optical Films and Methods of Forming". Pressure is selectively applied to the film, such as with an embossing die, to thin the film in selected areas or zones to produce the desired pattern. The selective thinning, which may produce a thickness reduction greater than 5% or greater than approximately 10%, is effective throughout the thickness of the film in the selected areas, such that the stack of optically thin layers ("microlayers") internal to the film, which microlayers are responsible for the observed reflective and transmissive characteristics, is also thinned in the selected areas relative to neighboring areas of the film. This thinning of the microlayers shifts any reflection bands associated with the microlayers to shorter wavelengths as a result of the shortened optical path length difference through the microlayers. The shift in the reflection band is manifested to the observer as a difference in reflected or transmitted color between the embossed and unembossed areas, so that the pattern is readily perceived.

For example, the '463 Merrill et al. patent describes an embossed color shifting security film in which a multilayer polymer film containing 418 internal microlayers (two packets of 209 microlayers each) was embossed in selected regions. Before embossing, and in unembossed areas after embossing, the microlayers had refractive indices and thicknesses that produced a reflection band whose short wavelength band edge shifted with incidence angle (viewing angle) from 720 nm at normal incidence, to 640 nm at 45 degree viewing, to an even shorter wavelength at 60 degree viewing, corresponding to a clear appearance at normal, to cyan at 45 degrees, to a brilliant cyan at 60 degrees. In these unembossed areas the film had a thickness of 3.4 mils, i.e., 0.0034 inches. The film was then embossed between a roll at 149 degrees C. and a pre-heated embossing plate to thin the film down to about 3.0 mils in the selected areas. The embossed areas exhibited a bright gold color at normal incidence, indicative of a band edge shift from 720 nm to shorter wavelengths. The observed color in the embossed areas changed to cyan or deeper blue at oblique viewing angles.

BRIEF SUMMARY

We describe herein, among other things, methods of internally patterning multilayer optical films that do not require the selective application of pressure, and do not rely on a selective thinning of the film to accomplish the patterning. Thus, in some cases, the internal patterning discussed herein can be accomplished without any selective application of pressure to the film, and/or without any significant thinning of the film. Rather, at least some of the disclosed methods accomplish the patterning by selectively reducing, in a second zone but not in a neighboring first zone, the birefringence of at least some of the interior layers of the film. In other cases, the internal patterning may be accompanied by a substantial change in thickness, the thickness change being either thicker or thinner depending on processing conditions.

The selective birefringence reduction can be performed by the judicious delivery of an appropriate amount of energy to the second zone so as to selectively heat at least some of the interior layers therein to a temperature high enough to produce a relaxation in the material that reduces or eliminates a preexisting optical birefringence, but low enough to maintain the physical integrity of the layer structure within the film. The reduction in birefringence may be partial or it may be complete, in which case interior layers that are birefringent in the first zone are rendered optically isotropic in the second zone. In exemplary embodiments, the selective heating is achieved at least in part by selective delivery of light or other radiant energy to the second zone of the film. The light may comprise ultraviolet, visible, or infrared wavelengths, or combinations thereof. At least some of the delivered light is absorbed by the film to provide the desired heating, with the amount of light absorbed being a function of the intensity, duration, and wavelength distribution of the delivered light, and the absorptive properties of the film. Such a technique for internally patterning a multilayer optical film is compatible with known high intensity light sources and electronically addressable beam steering systems, thus allowing for the creation of virtually any desired pattern or image in the film by simply steering the light beam appropriately, without the need for dedicated hardware such as image-specific embossing plates or photomasks.

Significantly, we describe such techniques in the context of multilayer optical films that utilize optical repeat units containing more than one birefringent layer. That is, the interior layers of the film responsible for the constructive or destructive interference of light associated with the first reflective characteristic are typically arranged in a stack of alternating first layers made of a first material, and second layers made of a different second material. Groups of these layers, typically a group containing one of the first layers and one of the second layers, forms the smallest subset of layers which can be considered to repeat in a pattern throughout the thickness of the stack, such smallest subset referred to as an optical repeat unit. In the disclosed films, the optical repeat unit preferably includes one of the first layers and one of the second layers, and both of these layers are birefringent in the drawn (stretched or oriented) multilayer optical film. Such films may be referred to as "doubly birefringent" multilayer optical films, even if the optical repeat unit contains more than two birefringent layers. When heat is selectively applied in a second zone of the doubly birefringent film to reduce birefringence and change the reflective characteristic, the birefringence of at least one of the layers of the optical repeat units may be reduced, and in some cases the birefringence of both layers of the optical repeat units may be reduced (whether in the same or different amounts).

We also describe a multilayer optical film that includes a plurality of interior microlayers arranged to selectively reflect light by constructive or destructive interference, the microlayers extending from a first zone to a neighboring second zone of the film. In the first zone, the plurality of interior microlayers provides a first reflective characteristic, and in the second zone, the plurality of interior microlayers provides a second reflective characteristic different from the first reflective characteristic. The plurality of interior microlayers includes a first set of microlayers comprising a first material and a second set of microlayers comprising a second material, and both the first and second set of microlayers are birefringent in the first zone. The first set of microlayers, at least, is less birefringent or isotropic in the second zone. In some cases the second set of microlayers substantially maintain their birefringence in the second zone; in other cases, the second set of microlayers are substantially isotropic in the second zone. In exemplary embodiments, the difference between the first and second reflective characteristics is not substantially attributable to any difference between the thickness of the film in the first and second zones, which difference in thickness may be zero. In some cases, the film may include one or more absorbing agents in one or more constituent layers thereof to promote an appropriate amount of heating during a patterning (selective heating or "writing") procedure.

We also describe a method of making a patterned multilayer optical film, that includes providing a multilayer optical film that comprises a plurality of interior microlayers arranged to provide a first reflective characteristic associated with constructive or destructive interference of light, the interior microlayers extending from a first zone to a neighboring second zone of the film, and the first and second zones each exhibiting the first reflective characteristic. The plurality of interior microlayers includes a first set of microlayers comprising a first material and a second set of microlayers comprising a second material different from the first material, the first and second set of microlayers each being birefringent in the first and second zones. The method also includes selectively heating the film in the second zone in an amount sufficient to cause at least the first set of microlayers to lose some or all of their birefringence in the second zone while maintaining the structural integrity of the plurality of interior microlayers in the second zone. The loss of birefringence produces a change from the first reflective characteristic to a different second characteristic in the second zone. The selective heating can be carried out such that the second set of microlayers substantially maintain their birefringence in the second zone, or so that the second set of microlayers lose some or all of their birefringence in the second zone. The selective heating can also be carried out without any substantial reduction in thickness of the film in the second zone, and without any selective application of pressure to the film.

We also describe a multilayer optical film that includes a plurality of interior microlayers arranged to selectively reflect light by constructive or destructive interference to provide a first reflective characteristic. The plurality of microlayers include a first set of microlayers comprising a first material and a second set of microlayers comprising a second material, and both the first and second set of microlayers are birefringent. The film also has an absorption characteristic tailored to heat the interior microlayers, in response to the film being illuminated with a suitable light beam, sufficiently to change a birefringence of at least some of the interior microlayers while maintaining the structural integrity of the plurality of interior microlayers, such change in birefringence being sufficient to change the first reflective characteristic to a different second reflective characteristic. In some cases, the first material may comprise a first polymer and an absorbing agent such as a dye or pigment. In some cases the absorbing dye or pigment may preferentially absorb light at wavelengths in the infrared region of the spectrum, e.g., at wavelengths greater than 700 nm.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

In the figures, like reference numerals designate like elements.

DETAILED DESCRIPTION OF ILLUSTRATIVE EMBODIMENTS

Figure 1:
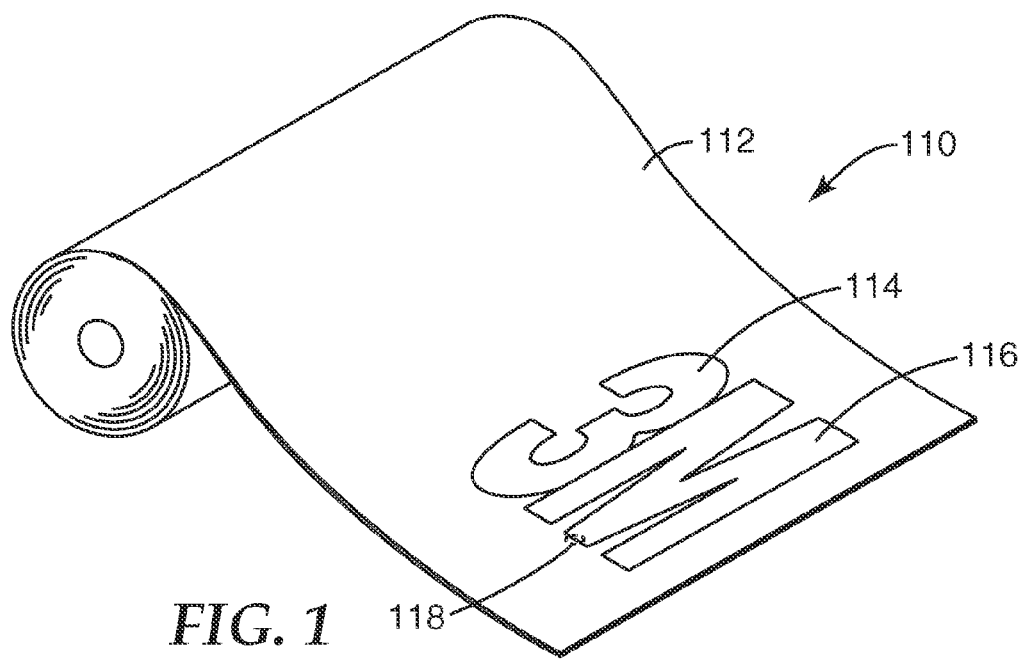
FIG. 1 is a perspective view of a roll of multilayer optical film that has been internally patterned to provide different reflective characteristics in different portions or zones of the film so as to form indicia.

FIG. 1 depicts a multilayer optical film 110 that has been internally patterned or spatially tailored using spatially selective birefringence reduction of at least some of the internal layers (not shown in FIG. 1). The internal patterning defines distinct zones 112, 114, 116 that are shaped so as to form the indicia "3M" as shown. The film 110 is shown as a long flexible material wound into a roll because the methodology described herein is advantageously compatible with high volume roll-to-roll processes. However, the methodology is not limited to flexible roll goods and can be practiced on small piece parts or samples as well as non-flexible films and articles.

The "3M" indicia is visible because the different zones 112, 114, 116 have different reflective characteristics. In the depicted embodiment, zone 112 has a first reflective characteristic and zones 114, 116 have a second reflective characteristic different from the first reflective characteristic. Typically, but not necessarily, the film 110 will be at least partially light transmissive, in which case the zones 112, 114, 116 will also have different transmissive characteristics that correspond to their respective reflective characteristics. In general, of course, transmission (T) plus reflection (R) plus absorption (A)=100%, or T+R+A=100%. In some embodiments the film is composed entirely of materials that have low absorption over at least a portion of the wavelength spectrum. This may be the case even for films that incorporate an absorbing dye or pigment to promote heat delivery, since some absorbing materials are wavelength-specific in their absorptivity. For example, infrared dyes are available that selectively absorb in the near-infrared wavelength region but that have very little absorption in the visible spectrum. At the other end of the spectrum, many polymer materials that are considered to be low loss in the multilayer optical film literature do have low loss over the visible spectrum but also have significant absorption at certain ultraviolet wavelengths. Thus, in many cases the multilayer optical film 110 may have an absorption that is small or negligible over at least a limited portion of the wavelength spectrum, such as the visible spectrum, in which case the reflection and transmission over that limited range take on a complementary relationship because T+R=100%−A, and since A is small, $$T+R \approx 100\%.$$

As will be explained further below, the first and second reflective characteristics are each the result of structural features that are internal to the film 110, rather than the result of coatings applied to the surface of the film or other surface features. This aspect of the disclosed films makes them advantageous for security applications (e.g. where the film is intended for application to a product, package, or document as an indicator of authenticity) because the interior features are difficult to copy or counterfeit.

The first and second reflective characteristics differ in some way that is perceptible under at least some viewing conditions to permit detection of the pattern by an observer or by a machine. In some cases it may be desirable to maximize the difference between the first and second reflective characteristics at visible wavelengths so that the pattern is conspicuous to human observers under most viewing and lighting conditions. In other cases it may be desirable to provide only a subtle difference between the first and second reflective characteristics, or to provide a difference that is conspicuous only under certain viewing conditions. In either case the difference between the first and second reflective characteristics is preferably attributable primarily to a difference in the refractive index properties of interior layers of the multilayer optical film in the different neighboring zones of the film, and is not primarily attributable to differences in thickness between the neighboring zones.

The zone-to-zone differences in refractive index can produce various differences between the first and second reflective characteristics depending on the design of the multilayer optical film. In some cases the first reflective characteristic may include a first reflection band with a given center wavelength, band edge, and maximum reflectivity, and the second reflective characteristic may differ from the first by having a second reflection band that is similar in center wavelength and/or band edge to the first reflection band, but that has a substantially different maximum reflectivity (whether greater or lesser) than the first reflection band, or the second reflection band may be substantially absent from the second reflection characteristic. These first and second reflection bands may be associated with light of only one polarization state, or with light of any polarization state depending on the design of the film.

In some cases the first and second reflective characteristics may differ in their dependence with viewing angle. For example, the first reflective characteristic may include a first reflection band that has a given center wavelength, band edge, and maximum reflectivity at normal incidence, and the second reflective characteristic may include a second reflection band that is very similar to these aspects of the first reflection band at normal incidence. With increasing incidence angle, however, although both the first and second reflection bands may shift to shorter wavelengths, their respective maximum reflectivities may deviate from each other greatly. For example, the maximum reflectivity of the first reflection band may remain constant or increase with increasing incidence angle, while the maximum reflectivity of the second reflection band, or at least the p-polarized component thereof, may decrease with increasing incidence angle.

In cases where the differences discussed above between the first and second reflective characteristics relate to reflection bands that cover a portion of the visible spectrum, the differences may be perceived as differences in color between the first and second zones of the film.

Figure 2:
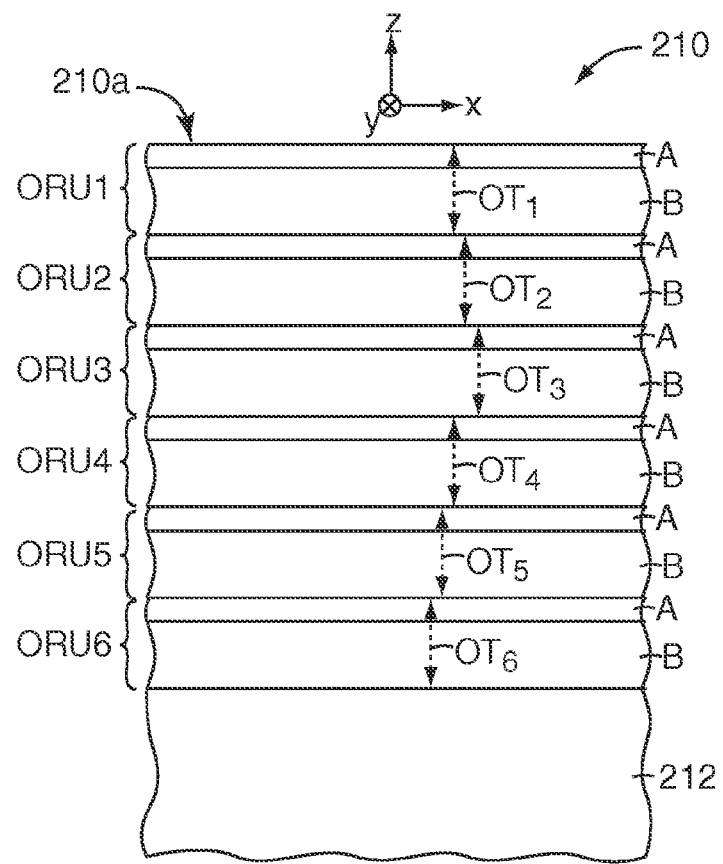
FIG. 2 is a schematic side view of a portion of a multilayer optical film.

Turning now to FIG. 2, we see there a portion of a multilayer film 210 in schematic side view to reveal the structure of the film including its interior layers. The film is shown in relation to a local x-y-z Cartesian coordinate system, where the film extends parallel to the x- and y-axes, and the z-axis is perpendicular to the film and its constituent layers and parallel to a thickness axis of the film. Note that the film 210 need not be entirely flat, but may be curved or otherwise shaped to deviate from a plane, and even in those cases arbitrarily small portions or regions of the film can be associated with a local Cartesian coordinate system as shown. The film 210 may in general be considered to represent the film 110 of FIG. 1 in any of its zones 112, 114, 116, since the individual layers of the film 110 preferably extend continuously from each such zone to the next.

Multilayer optical films include individual layers having different refractive indices so that some light is reflected at interfaces between adjacent layers. These layers, sometimes referred to as "microlayers", are sufficiently thin so that light reflected at a plurality of the interfaces undergoes constructive or destructive interference to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. However, thicker layers can also be included, such as skin layers at the outer surfaces of the multilayer optical film, or protective boundary layers (PBLs) disposed within the multilayer optical film to separate coherent groupings (known as "stacks" or "packets") of microlayers. In FIG. 2, the microlayers are labeled "A" or "B", the "A" layers being composed of one material and the "B" layers being composed of a different material, these layers being stacked in an alternating arrangement to form optical repeat units or unit cells ORU 1, ORU 2, ... ORU 6 as shown. Typically, a multilayer optical film composed entirely of polymeric materials would include many more than 6 optical repeat units if high reflectivities are desired. Note that all of the "A" and "B" microlayers shown in FIG. 2 are interior layers of film 210, except for the uppermost "A" layer whose upper surface in this illustrative example coincides with the outer surface 210a of the film 210. The substantially thicker layer 212 at the bottom of the figure can represent an outer skin layer, or a PBL that separates the stack of microlayers shown in the figure from another stack or packet of microlayers (not shown). If desired, two or more separate multilayer optical films can be laminated together, e.g. with one or more thick adhesive layers, or using pressure, heat, or other methods to form a laminate or composite film.

In some cases, the microlayers can have thicknesses and refractive index values corresponding to a ¼-wave stack, i.e., arranged in optical repeat units each having two adjacent microlayers of equal optical thickness (f-ratio=50%, the f-ratio being the ratio of the optical thickness of a constituent layer "A" to the optical thickness of the complete optical repeat unit), such optical repeat unit being effective to reflect by constructive interference light whose wavelength λ is twice the overall optical thickness of the optical repeat unit, where the "optical thickness" of a body refers to its physical thickness multiplied by its refractive index. In other cases, the optical thickness of the microlayers in an optical repeat unit may be different from each other, whereby the f-ratio is greater than or less than 50%. In the embodiment of FIG. 2, the "A" layers are depicted for generality as being thinner than the "B" layers. Each depicted optical repeat unit (ORU 1, ORU 2, etc.) has an optical thickness ($OT_1$, $OT_2$, etc.) equal to the sum of the optical thicknesses of its constituent "A" and "B" layer, and each optical repeat unit reflects light whose wavelength λ is twice its overall optical thickness. The reflectivity provided by microlayer stacks or packets used in multilayer optical films in general, and in the internally patterned multilayer films discussed herein in particular, is typically substantially specular in nature, rather than diffuse, as a result of the generally smooth well-defined interfaces between microlayers, and the low haze materials that are used in a typical construction. In some cases, however, the finished article may be tailored to incorporate any desired degree of scattering, e.g., using a diffuse material in skin layer(s) and/or PBL layer(s), and/or using one or more surface diffusive structures or textured surfaces, for example.

In some embodiments, the optical thicknesses of the optical repeat units in a layer stack may all be equal to each other, to provide a narrow reflection band of high reflectivity centered at a wavelength equal to twice the optical thickness of each optical repeat unit. In other embodiments, the optical thicknesses of the optical repeat units may differ according to a thickness gradient along the z-axis or thickness direction of the film, whereby the optical thickness of the optical repeat units increases, decreases, or follows some other functional relationship as one progresses from one side of the stack (e.g. the top) to the other side of the stack (e.g. the bottom). Such thickness gradients can be used to provide a widened reflection band to provide substantially spectrally flat transmission and reflection of light over the extended wavelength band of interest, and also over all angles of interest. Thickness gradients tailored to sharpen the band edges at the wavelength transition between high reflection and high transmission can also be used, as discussed in U.S. Pat. No. 6,157,490 (Wheatley et al.) "Optical Film With Sharpened Bandedge". For polymeric multilayer optical films, reflection bands can be designed to have sharpened band edges as well as "flat top" reflection bands, in which the reflection properties are essentially constant across the wavelength range of application. Other layer arrangements, such as multilayer optical films having 2-microlayer optical repeat units whose f-ratio is different from 50%, or films whose optical repeat units include more than two microlayers, are also contemplated. These alternative optical repeat unit designs can be configured to reduce or to excite certain higher-order reflections, which may be useful if the desired reflection band resides in or extends to near infrared wavelengths. See, e.g., U.S. Pat. No. 5,103,337 (Schrenk et al.) "Infrared Reflective Optical Interference Film", U.S. Pat. No. 5,360,659 (Arends et al.) "Two Component Infrared Reflecting Film", U.S. Pat. No. 6,207,260 (Wheatley et al.) "Multicomponent Optical Body", and U.S. Pat. No. 7,019,905 (Weber) "Multi-layer Reflector With Suppression of High Order Reflections".

As mentioned above, adjacent microlayers of the multilayer optical film have different refractive indices so that some light is reflected at interfaces between adjacent layers. We refer to the refractive indices of one of the microlayers (e.g. the "A" layers in FIG. 2) for light polarized along principal x-, y-, and z-axes as $n1x$, $n1y$, and $n1z$, respectively. The x-, y-, and z-axes may, for example, correspond to the principal directions of the dielectric tensor of the material. Typically, and for discussion purposes, the principle directions of the different materials are coincident, but this need not be the case in general. We refer to the refractive indices of the adjacent microlayer (e.g. the "B" layers in FIG. 2) along the same axes as $n2x$, $n2y$, $n2z$, respectively. We refer to the differences in refractive index between these layers as $\Delta nx$ ($=n1x-n2x$) along the x-direction, $\Delta ny$ ($=n1y-n2y$) along the y-direction, and $\Delta nz$ ($=n1z-n2z$) along the z-direction. The nature of these refractive index differences, in combination with the number of microlayers in the film (or in a given stack of the film) and their thickness distribution, controls the reflective and transmissive characteristics of the film (or of the given stack of the film) in a given zone. For example, if adjacent microlayers have a large refractive index mismatch along one in-plane direction ($\Delta nx$ large) and a small refractive index mismatch along the orthogonal in-plane direction ($\Delta ny \approx 0$), the film or packet may behave as a reflective polarizer for normally incident light. In this regard, a reflective polarizer may be considered for purposes of this application to be an optical body that strongly reflects normally incident light that is polarized along one in-plane axis (referred to as the "block axis") if the wavelength is within the reflection band of the packet, and strongly transmits such light that is polarized along an orthogonal in-plane axis (referred to as the "pass axis"). "Strongly reflects" and "strongly transmits" may have different meanings depending on the intended application or field of use, but in many cases a reflective polarizer will have at least 70, 80, or 90% reflectivity for the block axis, and at least 70, 80, or 90% transmission for the pass axis.

For purposes of the present application, a material is considered to be "birefringent" if the material has an anisotropic dielectric tensor over a wavelength range of interest, e.g., a selected wavelength or band in the UV, visible, and/or infrared portions of the spectrum. Stated differently, a material is considered to be "birefringent" if the principal refractive indices of the material (e.g., $n1x$, $n1y$, $n1z$) are not all the same.

In another example, adjacent microlayers may have a large refractive index mismatch along both in-plane axes ($\Delta nx$ large and $\Delta ny$ large), in which case the film or packet may behave as an on-axis mirror. In this regard, a mirror or mirror-like film may be considered for purposes of this application to be an optical body that strongly reflects normally incident light of any polarization if the wavelength is within the reflection band of the packet. Again, "strongly reflecting" may have different meanings depending on the intended application or field of use, but in many cases a mirror will have at least 70, 80, or 90% reflectivity for normally incident light of any polarization at the wavelength of interest. In variations of the foregoing embodiments, the adjacent microlayers may exhibit a refractive index match or mismatch along the z-axis ($\Delta nz \approx 0$ or $\Delta nz$ large), and the mismatch may be of the same or opposite polarity or sign as the in-plane refractive index mismatch(es). Such tailoring of $\Delta nz$ plays a key role in whether the reflectivity of the p-polarized component of obliquely incident light increases, decreases, or remains the same with increasing incidence angle. In yet another example, adjacent microlayers may have a substantial refractive index match along both in-plane axes ($\Delta nx \approx \Delta ny \approx 0$) but a refractive index mismatch along the z-axis ($\Delta nz$ large), in which case the film or packet may behave as a so-called "p-polarizer", strongly transmitting normally incident light of any polarization, but increasingly reflecting p-polarized light of increasing incidence angle if the wavelength is within the reflection band of the packet.

If the film 210 is a doubly birefringent multilayer optical film, then both the "A" layers and the "B" layers in FIG. 2 are birefringent. Stated differently, it is not the case that the "A" layers are isotropic, and it is also not the case that the "B" layers are isotropic. Stated still differently, it is not the case that $n1x=n1y=n1z$, and it is also not the case that $n2x=n2y=n2z$. Thus, for the "A" layers to be birefringent, at least one of $n1x$, $n1y$, and $n1z$ is significantly different from at least another one of $n1x$, $n1y$, $n1z$. And for the "B" layers to be birefringent at least one of $n2x$, $n2y$, and $n2z$ is significantly different from at least another one of $n2x$, $n2y$, $n2z$.

In view of the large number of permutations of possible refractive index differences along the different axes, the total number of layers and their thickness distribution(s), and the number and type of microlayer packets included in the multilayer optical film, the variety of possible multilayer optical films 210 and packets thereof is vast. Exemplary multilayer optical films are disclosed in: U.S. Pat. No. 5,486,949 (Schrenk et al.) "Birefringent Interference Polarizer"; U.S. Pat. No. 5,882,774 (Jonza et al.) "Optical Film"; U.S. Pat. No. 6,045,894 (Jonza et al.) "Clear to Colored Security Film"; U.S. Pat. No. 6,179,949 (Merrill et al.) "Optical Film and Process for Manufacture Thereof"; U.S. Pat. No. 6,531,230 (Weber et al.) "Color Shifting Film"; U.S. Pat. No. 6,939,499 (Merrill et al.) "Processes and Apparatus for Making Transversely Drawn Films with Substantially Uniaxial Character"; U.S. Pat. No. 7,256,936 (Hebrink et al.) "Optical Polarizing Films with Designed Color Shifts"; U.S. Pat. No. 7,316,558 (Merrill et al.) "Devices for Stretching Polymer Films"; PCT Publication WO 2008/144136 A1 (Nevitt et al.) "Lamp-Hiding Assembly for a Direct Lit Backlight"; PCT Publication WO 2008/144656 A2 (Weber et al.) "Backlight and Display System Using Same".

We note that at least some of the microlayers in at least one packet of the multilayer optical film are birefringent in at least one zone of the film (e.g., zones 112, 114, 116 of FIG. 1). For doubly birefringent microlayer packets, a first layer in the optical repeat units is birefringent (i.e., $n1x \neq n1y$, or $n1x \neq n1z$, or $n1y \neq n1z$), and a second layer in the optical repeat units is also birefringent (i.e., $n2x \neq n2y$, or $n2x \neq n2z$, or $n2y \neq n2z$). Moreover, the birefringence of one or more such layers is diminished in at least one zone relative to a neighboring zone. In some cases, the birefringence of these layers may be diminished to zero, such that they are optically isotropic (i.e., $n1x=n1y=n1z$, or $n2x=n2y=n2z$) in one of the zones but birefringent in a neighboring zone. In cases where both layers are initially birefringent, depending on materials selection and processing conditions, they can be processed in such a way that the birefringence of only one of the layers is substantially diminished, or the birefringence of both layers may be diminished.

Exemplary multilayer optical films are composed of polymer materials and may be fabricated using coextruding, casting, and orienting processes. Reference is made to U.S. Pat. No. 5,882,774 (Jonza et al.) "Optical Film", U.S. Pat. No. 6,179,949 (Merrill et al.) "Optical Film and Process for Manufacture Thereof", and U.S. Pat. No. 6,783,349 (Neavin et al.) "Apparatus for Making Multilayer Optical Films". The multilayer optical film may be formed by coextrusion of the polymers as described in any of the aforementioned references. The polymers of the various layers are preferably chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

In brief summary, the fabrication method may comprise: (a) providing at least a first and a second stream of resin corresponding to the first and second polymers to be used in the finished film; (b) dividing the first and the second streams into a plurality of layers using a suitable feedblock, such as one that comprises: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic.

Many alternative methods of fabricating the cast multilayer web can also be used. One such alternative method that also utilizes polymer coextrusion is described in U.S. Pat. No. 5,389,324 (Lewis et al.).

After cooling, the multilayer web can be drawn or stretched to produce the near-finished multilayer optical film, details of which can be found in the references cited above. The drawing or stretching accomplishes two goals: it thins the layers to their desired final thicknesses, and it orients the layers such that at least some of the layers become birefringent. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

The multilayer optical films and film bodies can also include additional layers and coatings selected for their optical, mechanical, and/or chemical properties. For example, a UV absorbing layer can be added at one or both major outer surfaces of the film to protect the film from long-term degradation caused by UV light. Additional layers and coatings can also include scratch resistant layers, tear resistant layers, and stiffening agents. See, e.g., U.S. Pat. No. 6,368,699 (Gilbert et al.).

In some cases, the natural or inherent absorptivity of one, some, or all of the constituent polymer materials that make up the multilayer optical film may be utilized for the absorptive heating procedure. For example, many polymers that are low loss over the visible region have substantially higher absorptivity at certain ultraviolet wavelengths. Exposing portions of the film to light of such wavelengths may be used to selectively heat such portions of the film.

In other cases, absorbing dyes, pigments, or other agents can be incorporated into some or all of the individual layers of the multilayer optical film to promote absorptive heating as mentioned above. In some cases, such absorbing agents are spectrally selective, whereby they absorb in one wavelength region but not in another. For example, some of the disclosed films may be intended for use in the visible region, such as with anti-counterfeiting security labels or as a component of a liquid crystal display (LCD) device or other display device, in which case an absorbing agent that absorbs at infrared or ultraviolet wavelengths but not substantially at visible wavelengths may be used. Further, an absorbing agent may be incorporated into one or more selected layers of a film. For example, the film may comprise two distinct microlayer packets separated by an optically thick layer such as a protective boundary layer (PBL), a laminating adhesive layer, one or more skin layers, or the like, and an absorbing agent may be incorporated into one of the packets and not the other, or may be incorporated into both packets but at a higher concentration in one relative to the other.

A variety of absorbing agents can be used. For optical films operating in the visible spectrum, dyes, pigments, or other additives that absorb in the ultraviolet and infrared (including near infrared) regions may be used. In some cases it may be advantageous to select an agent that absorbs in a spectral range for which the polymer materials of the film have a substantially lower absorption. By incorporating such an absorbing agent into selected layers of a multilayer optical film, directed radiation can preferentially deliver heat to the selected layers rather than throughout the entire thickness of the film. Exemplary absorbing agents may be melt extrudable so that they can be embedded into a selected layer set of interest. To this end, the absorbers are preferably reasonably stable at the processing temperatures and residence times required for extrusion. For further information on suitable absorbing agents, reference is made to U.S. Pat. No. 6,207,260 (Wheatley et al.) "Multicomponent Optical Body".

Figure 3:
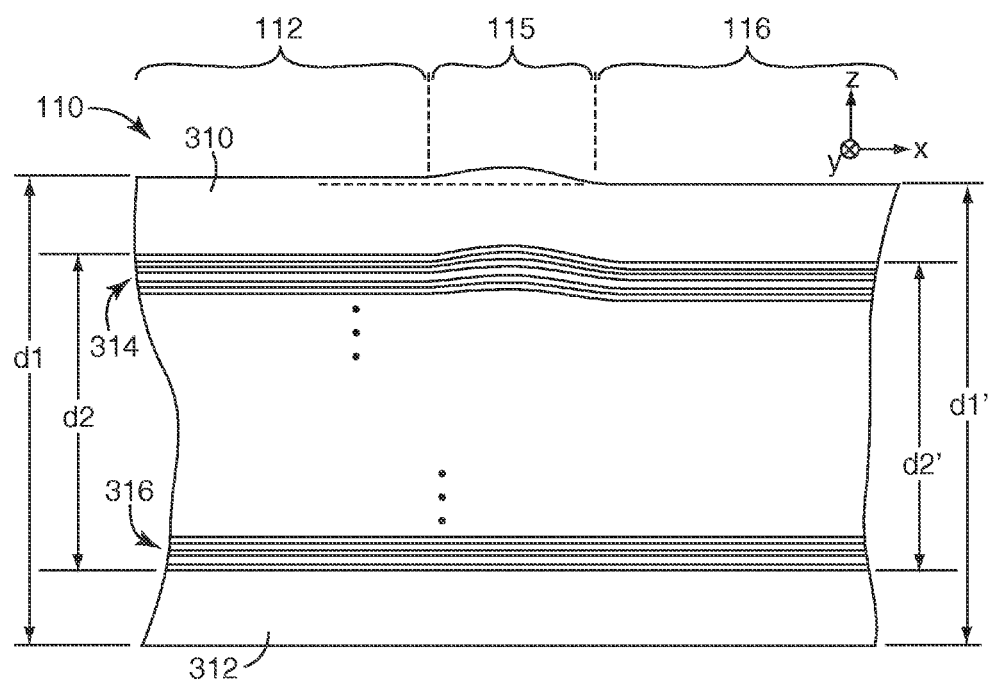
FIG. 3 is schematic sectional view of a portion of the multilayer optical film of FIG. 1.

We turn now to FIG. 3, which shows a schematic sectional view of a portion of the multilayer optical film 110 of FIG. 1 in the vicinity of area 118 at a boundary of zone 112 and zone 116. In this expanded view of the film 110, a narrow transition zone 115 can be seen separating the zone 112 from the neighboring zone 116. Such a transition zone may or may not be present depending on processing details, and if it is not present then zone 116 may be immediately adjacent to zone 112 with no significant intervening features. Construction details of film 110 can also be seen: the film includes optically thick skin layers 310, 312 on opposite sides thereof, with a plurality of microlayers 314 and another plurality of microlayers 316 disposed between the skin layers 310, 312. All of the microlayers 314, 316 are interior to the film 110 by virtue of the outer skin layers. The space between microlayers 314 and 316 is left open in the drawing, to allow for the case where the microlayers 314, 316 are portions of a single microlayer packet that begins at one skin layer 310 and ends at the opposite skin layer 312, and also the case where the microlayers 314, 316 are portions of two or more distinct microlayer packets that are separated from each other by one or more optically thick protective boundary layers (PBLs) or other optically thick interior layer(s). In either case, the microlayers 314, 316 preferably each comprise two alternating polymer materials arranged into optical repeat units, each of the microlayers 314, 316 extending continuously in a lateral or transverse fashion from the zone 112 to the neighboring zone 116 as shown. The microlayers 314, 316 provide a first reflective characteristic in the zone 112 by constructive or destructive interference, and at least some of the microlayers 314, 316 are birefringent. The zones 115, 116 may have previously had the same characteristics as zone 112, but have been processed by the selective application of heat thereto in an amount sufficient to reduce or eliminate the birefringence of some of the microlayers 314, 316 in the zone 116 while maintaining the birefringence of the microlayers in zone 112, the heat also being low enough to maintain the structural integrity of the microlayers 314, 316 in the treated zone 116. The reduced birefringence of the microlayers 314, 316 in the zone 116 is primarily responsible for a second reflective characteristic for the zone 116 that is different from the first reflective characteristic for the zone 112.

The film 110 has characteristic thicknesses d1, d2 in zone 112, and characteristic thicknesses d1', d2' in zone 116, as shown in the figure. The thicknesses d1, d1' are physical thicknesses measured from a front outer surface of the film to a rear outer surface of the film in the respective zones. The thicknesses d2, d2' are physical thicknesses measured from the microlayer (at one end of a microlayer packet) that is disposed nearest the front surface of the film to the microlayer (at an end of the same or a different microlayer packet) that is disposed nearest the rear surface of the film. Thus, if one wishes to compare the thickness of the film 110 in zone 112 with the thickness of the film in zone 116, one may choose to compare d1 to d1', or d2 to d2', depending on which measurement is more convenient. In most cases the comparison between d1 and d1' may well yield substantially the same result (proportionally) as the comparison between d2 and d2'. (Of course, in cases where the film contains no outer skin layers, and where microlayer packets terminate at both outer surfaces of the film, d1 and d2 become the same.) However, where a significant discrepancy exists, such as where a skin layer experiences a significant thickness change from one place to another but no corresponding thickness change exists in the underlying microlayers, or vice versa, then it may be desirable to use the d2 and d2' parameters as being more representative of the overall film thickness in the different zones, in view of the fact that the skin layers typically have a minor effect on the reflective characteristics of the film compared to the microlayer packet(s).

Of course, for multilayer optical films containing two or more distinct microlayer packets separated from each other by optically thick layers, the thickness of any given microlayer packet can also be measured and characterized as the distance along the z-axis from the first to the last microlayer in the packet. This information may become significant in a more in-depth analysis that compares the physical characteristics of the film 110 in the different zones 112, 116.

As mentioned, the zone 116 has been treated with the selective application of heat to cause at least some of the microlayers 314, 316 to lose some or all of their birefringence relative to their birefringence in neighboring zone 112, such that zone 116 exhibits a reflective characteristic, resulting from constructive or destructive interference of light from the microlayers, that differs from a reflective characteristic of zone 112. The selective heating process may involve no selective application of pressure to zone 116, and it may result in substantially no thickness change (whether using the parameters d1/d1' or the parameters d2/d2') to the film. For example, the film 110 may exhibit an average thickness in zone 116 that deviates from an average thickness in zone 112 by no more than the normal variability in thickness that one observes in the zone 112, or in the untreated film. Thus, the film 110 may exhibit in zone 112, or over an area of the film encompassing a portion of zone 112 and zone 116 before the heat treatment of zone 116, a variability in thickness (whether d1 or d2) of Δd, and the zone 116 may have spatially averaged thicknesses d1', d2' which differ from spatially averaged thicknesses d1, d2 (respectively) in zone 112 by no more than Δd. The parameter Δd may represent, for example, one, two, or three standard deviations in the spatial distribution of the thickness d1 or d2.

In some cases, the heat treatment of zone 116 may give rise to certain changes to the thickness of the film in zone 116. These thickness changes may result from, for example, local shrinkage and/or expansion of the different materials that constitute the multilayer optical film, or may result from some other thermally-induced phenomenon. However, such thickness changes, if they occur, play only a secondary role in their effect on the reflective characteristic of the treated zone 116 compared to the primary role played by the reduction or elimination of birefringence in the treated zone. Note also that in many cases it may be desirable to hold the film by its edges under tension during the selective heat treatment that accomplishes the internal patterning, in order to avoid wrinkling of the film, or for other reasons. The amount of tension applied and details of the heat treatment may also result in some amount of thickness change in the treated zones.

In some cases it is possible to distinguish the effect of a thickness change from a change in birefringence by analyzing the reflective properties of the film. For example, if the microlayers in an untreated zone (e.g. zone 112) provide a reflection band characterized by a left band edge (LBE), right band edge (RBE), center wavelength $\lambda_c$, and peak reflectivity $R_1$, a given thickness change for those microlayers (with no change in the refractive indices of the microlayers) will produce a reflection band for the treated zone having a peak reflectivity $R_2$ about the same as $R_1$, but having an LBE, RBE, and center wavelength that are proportionally shifted in wavelength relative to those features of the reflection band of the untreated zone, and this shift can be measured. On the other hand, a change in birefringence will typically produce only a very minor shift in wavelength of the LBE, RBE, and center wavelengths, as a result of the (usually very small) change in optical thickness caused by the change in birefringence. (Recall that optical thickness equals physical thickness multiplied by refractive index.) The change in birefringence can, however, have a large or at least a significant effect on the peak reflectivity of the reflection band, depending on the design of the microlayer stack. Thus, in some cases, the change in birefringence may provide a peak reflectivity $R_2$ for the reflection band in the modified zone that differs substantially from $R_1$, where of course $R_1$ and $R_2$ are compared under the same illumination and observation conditions. If $R_1$ and $R_2$ are expressed in percentages, $R_2$ may differ from $R_1$ by at least 10%, or by at least 20%, or by at least 30%. As a clarifying example, $R_1$ may be 70%, and $R_2$ may be 60%, 50%, 40%, or less. Alternatively, $R_1$ may be 10%, and $R_2$ may be 20%, 30%, 40%, or more. $R_1$ and $R_2$ may also be compared by taking their ratio. For example, $R_2/R_1$ or its reciprocal may be at least 2, or at least 3.

A significant change in peak reflectivity, to the extent it is indicative of a change in the interfacial reflectivity (sometimes referred to as optical power) resulting from a change in refractive index difference between adjacent layers due to a change in birefringence, is also typically accompanied by at least some change in the bandwidth of the reflection band, where the bandwidth refers to the separation between the LBE and RBE.

As we have discussed, in some cases the thickness of the film 110 in the treated zone 116, i.e., d1' or d2', may differ somewhat from the thickness of the film in the untreated zone 112, even if no selective pressure was in fact applied to the zone 116 during heat treatment. For this reason, FIG. 3 depicts d1' as being slightly different from d1, and d2' as being slightly different from d2. A transition zone 115 is also shown for generality, to show that a "bump" or other detectable artifact may exist on the outer surface of the film as a consequence of the selective heat treatment. In some cases, however, the treatment may result in no detectable artifact between the neighboring treated and untreated zones. For example, in some cases an observer who slides his or her finger across the boundary between the zones may detect no bump, ridge, or other physical artifact between the zones.

Under some circumstances it is possible for thickness differences between treated and untreated zones to be non-proportional through the thickness of the film. For example, in some cases it is possible for an outer skin layer to have a relatively small thickness difference, expressed as a percentage change, between the treated and untreated zones, while one or more internal microlayer packets may have a larger thickness difference, also expressed as a percentage change, between the same zones.

Figure 4:
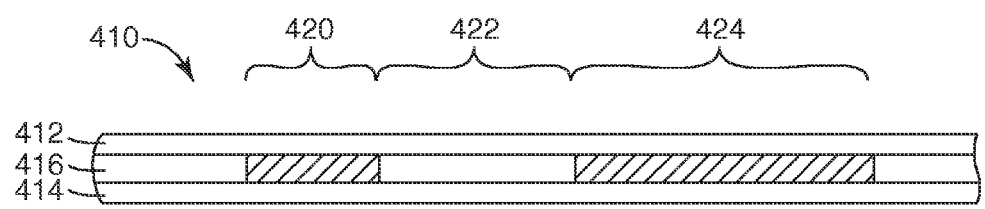
FIG. 4 is a schematic sectional view of a portion of another multilayer optical film with internal patterning.

FIG. 4 shows a schematic sectional view of a portion of another multilayer optical film 410 that incorporates internal patterning. Film 410 comprises outer optically thick skin layers 412, 414, and a packet of microlayers that reside in a stratum or layer 416 sandwiched between the skin layers. All of the microlayers are internal to the film 410. (In alternative embodiments, one or both skin layers may be omitted, in which case one or both PBLs or outermost microlayers in the packet may become external layers.) The microlayers include at least some microlayers that are birefringent in at least some zones or areas of the film and that extend in a lateral or transverse fashion at least between neighboring zones of the film. The microlayers provide a first reflective characteristic associated with constructive or destructive interference of light at least in a first untreated zone 422 of the film. The film 410 has been selectively heated in the neighboring zones 420, 424, without applying any pressure selectively to these zones, so as to provide a second reflective characteristic also associated with constructive or destructive interference of light, but that differs from the first reflective characteristic. These differences in reflective characteristics may be manifested to an observer as differences in color between the treated and untreated zones in reflected or transmitted light. The respective colors and the differences therebetween also typically change or shift with angle of incidence. The film 410 may have substantially the same film thickness in the zones 420, 422, 424, or the film thickness may vary somewhat between these zones, but any difference in film thickness between the zones is not primarily responsible for the differences between the first and second reflective characteristics. The zones 420, 422, 424 form a pattern that is internal or interior to the film, as indicated by the crosshatching in the stratum or layer 416. The crosshatching indicates that at least some of the microlayers in the crosshatched region have a reduced birefringence (including zero birefringence) compared to their birefringence in the zone 422 or in other untreated zones.

Figure 5A:
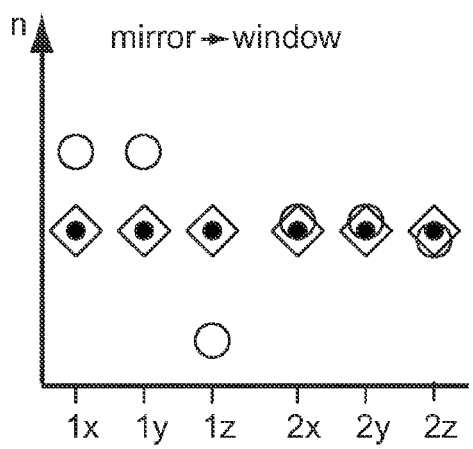
FIGS. 5A-N are idealized plots showing each refractive index (nx, ny, nz) of each layer of a 2-layer optical repeat unit, for different stages of manufacture of various internally patterned multilayer optical films.
Figure 5B:
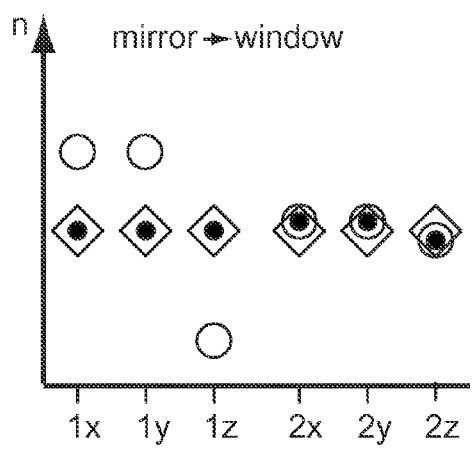
Figure 5C:
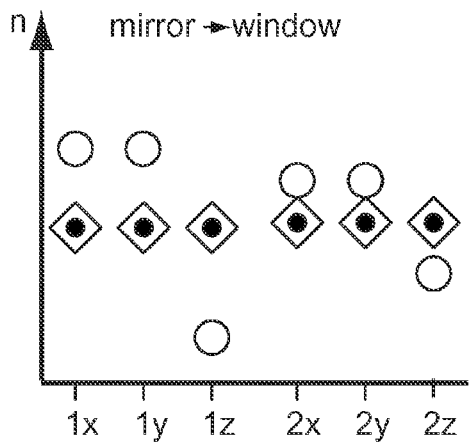
Figure 5D:
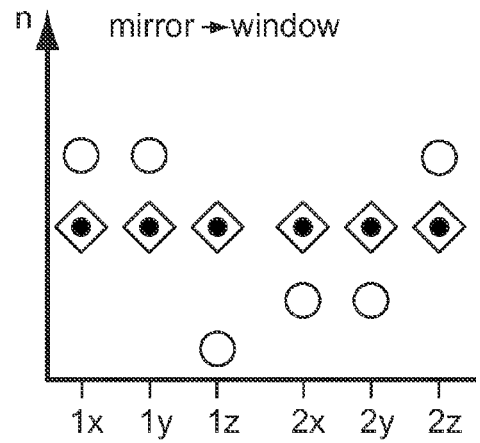
Figure 5E:
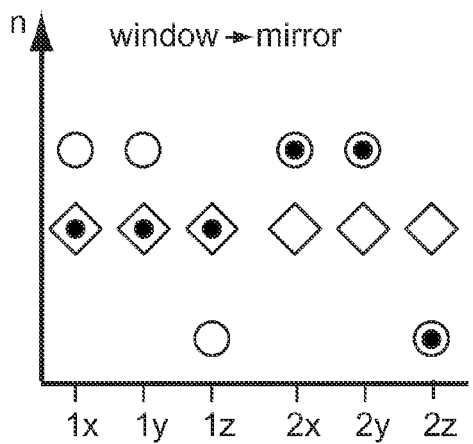
Figure 5F:
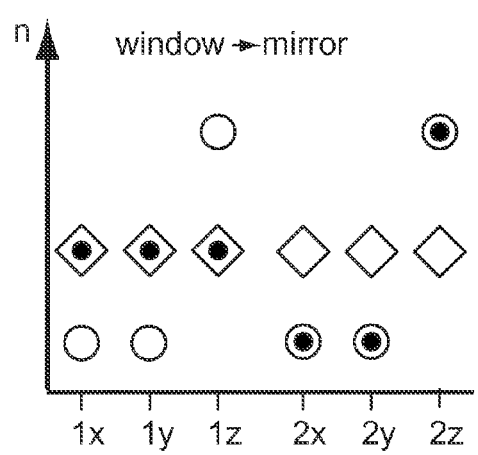
Figure 5G:
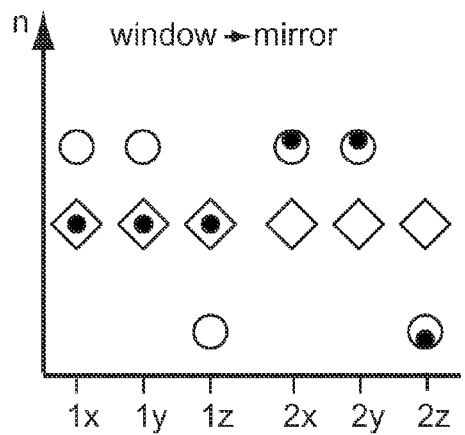
Figure 5H:
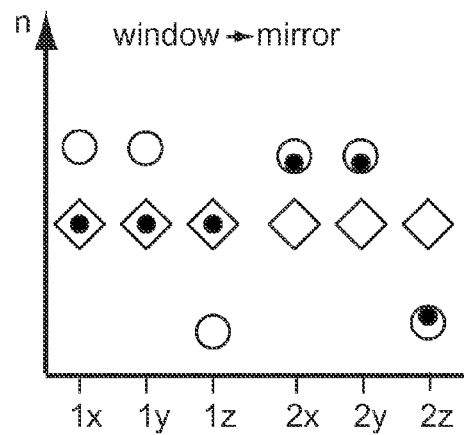
Figure 5I:
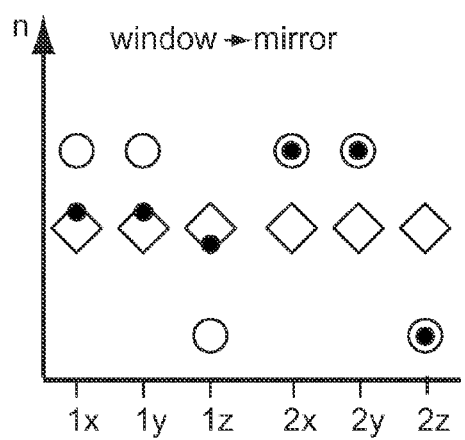
Figure 5J:
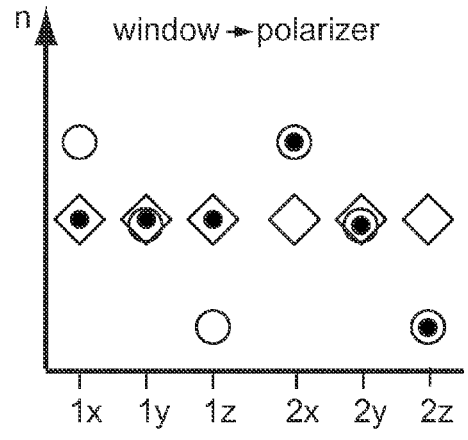
Figure 5K:
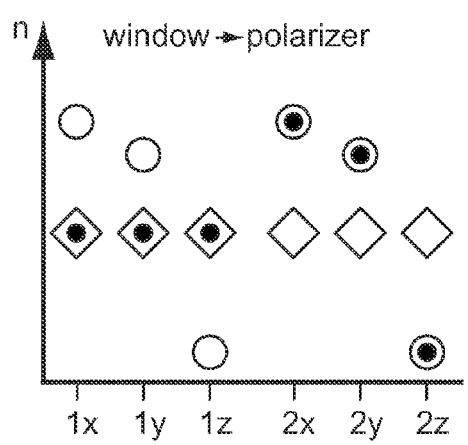
Figure 5L:
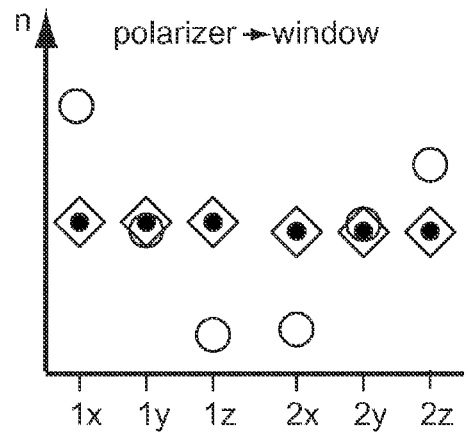
Figure 5M:
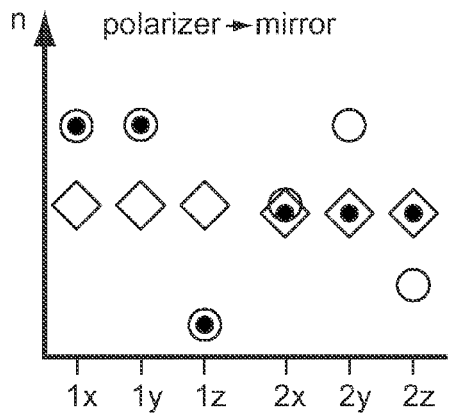
Figure 5N:
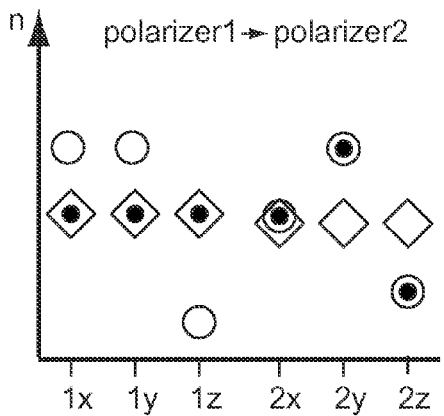

We now turn our attention to the idealized graphs of FIGS. 5A-N. These graphs help to explain the process of patterning the multilayer optical films, with particular emphasis on doubly birefringent multilayer optical films. They also help explain some of the different possible combinations of first and second reflective characteristics in the untreated and treated zones, respectively, and how they are achieved. For descriptive purposes, the reflective characteristics of both the untreated and treated zones of an optical film may be categorized into one of following three types: mirror-like reflective characteristics, window-like reflective characteristics, and polarizer-like reflective characteristics. A mirror-like reflective characteristic exhibits high reflectivity (e.g., in some cases greater than 50%, 60%, 70%, 80%, 90%, 95%, or 99%) for all polarization states of normally incident light, a window-like reflective characteristic exhibits low reflectivity (e.g., in some cases less than 20%, 10%, 5%, 3%, or 1%) for all polarization states of normally incident light, and a polarizer-like reflective characteristic exhibits high reflectivity (e.g., in some cases greater than 50%, 60%, 70%, 80%, 90%, 95%, or 99%) for normally incident light of one polarization state and low reflectivity (e.g., in some cases less than 30%, 20%, 10%, 5%, 3%, or 1%) for normally incident light of a different polarization state. (The reflective polarizer-like characteristic may alternatively be expressed in terms of the difference in reflectivity of one polarization state relative to the other polarization state.) The reader will keep in mind that reflectivity values discussed herein that are associated with multilayer optical films or stacks should be considered to not include the Fresnel reflections at the outer air/polymer interfaces, unless otherwise indicated.

The boundaries or limits of these different characteristics—e.g., what is considered to be "high" reflectivity and what is considered to be "low" reflectivity—and the distinctions therebetween may depend on the end-use application and/or on system requirements. For example, a multilayer optical film, or a microlayer packet thereof, that exhibits moderate levels of reflectivity for all polarization states may be considered to be a mirror for purposes of some applications and a window for purposes of other applications. Similarly, a multilayer optical film, or a microlayer packet thereof, that provides moderately different levels of reflectivity for different polarization states of normally incident light may be considered to be a polarizer for some applications, a mirror for other applications, and a window for still other applications, depending on the exact reflectivity values and on the sensitivity of a given end-use application to differences in reflectivity for different polarization states. Unless otherwise indicated, the mirror, window, and polarizer categories are specified for normally incident light. The reader will understand that oblique-angle characteristics may in some cases be the same as or similar to, and in other cases may be drastically different from, the characteristics of an optical film at normal incidence.

In each of the graphs of FIGS. 5A-N, relative refractive index "n" is plotted on the vertical axis. On the horizontal axis, a position or mark is provided for each of the six refractive indices that characterize a two-layer optical repeat unit: "1x", "1y", and "1z" represent the refractive indices of the first layer along the x-, y-, and z-axes, which were referred to above as n1x, n1y, and n1z. Likewise, "2x", "2y", and "2z" represent the refractive indices of the second layer along the x-, y-, and z-axes, which were referred to above as n2x, n2y, and n2z. Diamond-shaped symbols (◊) in the figures represent refractive indices of the materials in a first processing stage. This first stage may correspond to polymer layers that have been extruded and quenched or cast onto a casting wheel, for example, but that have not yet been stretched or otherwise oriented. Open (unfilled) circle-shaped symbols (○) in the figures represent refractive indices of materials in a second stage of processing, later than the first stage. The second stage may correspond to polymer layers that have been stretched or otherwise oriented into a multilayer optical film that reflects light by constructive or destructive interference from interfaces between microlayers within the film. Small filled circle-shaped symbols or dots (●) in the figures represent refractive indices of the materials in a third stage of processing, later than the first and second stages. The third stage may correspond to polymer layers that, after being extruded and oriented, have been selectively heat treated, as discussed further below. Such heat treatment is typically limited to one or more particular portions or zones of a film, referred to as treated zones.

By comparing the vertical coordinates of the various symbols in a given figure, the reader can readily ascertain a great deal of information about the optical film, its method of manufacture, and the optical properties of its treated and untreated portions. For example, the reader can ascertain: if one or both material layers are or were birefringent before or after the selective heat treatment, and whether the birefringence is uniaxial or biaxial, and whether the birefringence is large or small. The reader can also ascertain from FIGS. 5A-N relative magnitudes of each of the refractive index differences Δnx, Δny, Δnz between the two layers, for each of the three processing stages (cast state, stretched state, and treated state).

As discussed above, a precursor article to the finished, internally patterned multilayer optical film can be a cast web of polymer material. The cast web may have the same number of layers as the finished film, and the layers may be composed of the same polymer materials as those used in the finished film, but the cast web is thicker and its layers are usually all isotropic. In some cases, however, not depicted in the figures, the casting process may itself impart a level of orientation and birefringence in one or more of the materials. The diamond-shaped symbols in FIGS. 5A-N represent the refractive indices of the two polymer layers in the cast web that, after a subsequent stretching procedure, become the microlayers in the optical repeat units of the multilayer optical film. After stretching, at least some of the layers become oriented and birefringent, and an oriented (but still unpatterned) multilayer optical film is formed. This is exemplified in FIGS. 5A-N by open circles that may be vertically displaced from their respective original values represented by the diamond-shaped symbols. For example, one type of stretching procedure may raise the refractive index of a given layer along the x-axis, but lower its refractive index along the y- and z-axis. Such a refractive index shift may be obtained by suitably uniaxially stretching a positively birefringent polymer layer along the x-axis while allowing the film to dimensionally relax along the y- and z-axes. In FIGS. 5A-E, the stretching procedure raises the refractive index of the first layer along the x- and y-axes, but lowers its refractive index along the z-axis. Such a refractive index shift may be obtained by suitably biaxially stretching a positively birefringent polymer layer along the x- and y-axes. In FIG. 5J, the stretching procedure raises the refractive index of the first layer along the x-axis, lowers its refractive index along the z-axis, and maintains about the same refractive index along the y-axis. In some cases, this refractive index shift may be obtained by biaxially stretching a positively birefringent polymer layer asymmetrically along the x- and y-axes, using a higher degree of stretch along the x-axis compared to the y-axis. In other cases, this may be approximately obtained by uniaxially stretching along an x-axis while constraining the film in the y-axis (constrained uniaxial stretching). Note that in each of FIGS. 5A-N, the first and second layers in their oriented but untreated states (open circles) are both birefringent.

After formation of the at least partially birefringent multilayer optical film having the microlayers arranged into optical repeat units to provide the first reflective characteristic, the film is ready for the selective heating discussed above. The heating is carried out selectively in a second zone which neighbors a first zone of the multilayer optical film, and is tailored to selectively melt and disorient in part or in whole at least one birefringent material in the microlayer packet in order to reduce or eliminate the birefringence in at least some of the microlayers while leaving their birefringence unchanged in the first (untreated) zone. The selective heating is also carried out to maintain the structural integrity of the layers in the second zone. If the birefringent material in the treated second zone is disoriented in whole, i.e., completely, then the birefringent microlayers return to the isotropic state (e.g. of the cast web), while remaining optically thin. This can be seen in FIGS. 5A-H, where heat treatment causes the refractive indices of the first layer (see the small dark dots associated with n1x, n1y, and n1z) to revert to their values in the cast web state (see the diamond-shaped symbols for the same refractive indices n1x, n1y, n1z). Recall that the diamond-shaped symbols represent the refractive indices of layers in the isotropic state (e.g, the cast web), the small dark dots represent the refractive indices of microlayers in the treated or selectively heated zones in the finished, internally patterned film, and the open circles represent the refractive indices of microlayers in untreated zones of the finished, internally patterned film.

If the birefringent material in the treated second zone is disoriented only in part, i.e., incompletely, then the birefringent microlayers relax to a state of birefringence that is less than the birefringent state before heating but is not isotropic. In this case, the refractive indices of the birefringent material in the treated second zone acquire values somewhere between the diamond-shaped symbols and the open circles. See e.g. FIGS. 5A-N.

FIGS. 5A-D depict refractive index relationships for multilayer optical films that may have a mirror-like reflection characteristic in one or more first (untreated) zones, and a window-like reflection characteristic in one or more second (treated) zones. In FIG. 5A, first and second polymer materials are selected that have substantially the same refractive index in the cast state before drawing, and both materials have positive stress-optic coefficients. The materials are coextruded in an alternating layer arrangement with a suitable number of layers to form a multilayer cast web, having indices shown by the diamond-shaped symbols. The cast web is then biaxially stretched substantially equally along the x- and y-axes under suitable conditions to induce birefringence in the first and second polymer materials. Both materials experience a refractive index increase along the x- and y-directions, and a decrease in the z-direction, but the magnitude of these increases and decreases are much larger for the first material than for the second material as a result of the first material having a much greater stress-optic coefficient under the assumed draw conditions. The result in the drawn (stretched) multilayer optical film is significant in-plane refractive index mismatches ($\Delta nx$, $\Delta ny$) and a somewhat larger out-of-plane refractive index mismatch ($\Delta nz$) of opposite polarity or sign. This set of refractive indices, when implemented in a microlayer packet with an adequate number of layers, can provide a multilayer mirror film whose reflectivity for obliquely incident p-polarized light increases with increasing incidence angle. The mirror film may be broad band or narrow band, depending on the layer thickness distribution of the microlayers.

This mirror film can then be internally patterned in a second zone as described above, while leaving the mirror film intact in a first zone. Selective heating by selective delivery of radiant energy to the second zone causes the birefringent layers to relax to their original isotropic states, or to an intermediate birefringent state if the disorientation is incomplete. If relaxation is complete, the second zone can become a multilayer window film with $\Delta nx = \Delta ny = \Delta nz = 0$. The reflective characteristic for this portion of the film is virtually no reflection and virtually complete transmission (excluding Fresnel reflections at the two outer surfaces), even though the layer structure of the different material layers is preserved. (In practical embodiments, refractive index matching is typically not perfect over the entire area, and a small reflectivity may be detected in at least some locations as confirmation of the preserved multilayer structure.) The finished film thus combines in a unitary film a mirror film in one zone and a window film in a neighboring zone, with microlayers that extend continuously from one zone to the next. For this FIG. 5A, the selective heat treatment process is able to change a multilayer mirror film to a multilayer window film, i.e.: mirror→window.

FIG. 5B is very similar to FIG. 5A, insofar as the first and second materials have substantially the same refractive index in the cast state before drawing, both materials have positive stress-optic coefficients, the materials are coextruded to form a multilayer cast web, and the cast web is biaxially stretched substantially equally along the x- and y-axes under suitable conditions to induce birefringence in the first and second polymer materials. Again, both materials experience a refractive index increase along the x- and y-directions, and a decrease in the z-direction, with the magnitude of these increases and decreases being much larger for the first material than for the second material. The refractive index relationships for the drawn (stretched) multilayer optical film are substantially the same as in FIG. 5A, yielding a broad band or narrow band multilayer mirror film when implemented in a microlayer packet with an adequate number of layers.

A small but clear difference occurs, however, when the selective heating is carried out to accomplish internal patterning in the second zone of the film. In the case of FIG. 5B, the first and second materials have different melting or softening points, and the selective heating is controlled to a temperature that is above the melting or softening point of the first material layer, but below the melting or softening point of the second material layer. In this way, the selective heating causes the first birefringent layers in the second zone to relax to their original isotropic states, or to an intermediate birefringent state if the disorientation is incomplete, while causing the second birefringent layers in the second zone to substantially maintain their birefringence. If relaxation of the first material is complete, the second zone is characterized by very small refractive index differences along all principal directions, i.e., $\Delta nx \approx \Delta ny \approx \Delta nz \approx 0$, producing another multilayer window film similar to that of FIG. 5A. The finished film thus combines in a unitary film a multilayer mirror film in one zone and a multilayer window film in a neighboring zone, with microlayers that extend continuously from one zone to the next. For this FIG. 5B, the selective heat treatment process is able to change a multilayer mirror film to a multilayer window film (mirror→window).

FIG. 5C is also similar to FIG. 5A, but in a different way from FIG. 5B. In FIG. 5C, the first and second materials again have substantially the same refractive index in the cast state before drawing, and both materials have positive stress-optic coefficients, and the materials are coextruded to form a multilayer cast web, and the cast web is biaxially stretched substantially equally along the x- and y-axes under suitable conditions to induce birefringence in the first and second polymer materials, and both materials experience a refractive index increase along the x- and y-directions and a decrease in the z-direction. FIG. 5C differs from FIG. 5A by the amount that the second material orients after the drawing (stretching) operation. Thus, although the magnitude of the refractive index increases and decreases are again larger for the first material than for the second material, the stress-optic coefficient for the second material under the assumed draw conditions is greater in FIG. 5C than in FIG. 5A, and the refractive index shift of the second material after drawing is greater than in FIG. 5A. The result in the drawn multilayer optical film is again significant in-plane refractive index mismatches ($\Delta nx$, $\Delta ny$) and a larger out-of-plane refractive index mismatch ($\Delta nz$) of opposite polarity or sign, although these mismatches are all of smaller magnitude than the respective mismatches in the drawn film of FIG. 5A, and thus the reflective power at each layer interface will be smaller. Nevertheless, the refractive index relationships for the drawn (stretched) multilayer optical film yield a broad band or narrow band multilayer mirror film when implemented in a microlayer packet with an adequate number of layers.

This mirror film can then be internally patterned in a second zone in the same manner as the mirror film of FIG. 5A, and with the same results. The finished film thus combines in a unitary film a mirror film in one zone and a window film in a neighboring zone, with microlayers that extend continuously from one zone to the next. For this FIG. 5C, the selective heat treatment process is able to change a multilayer mirror film to a multilayer window film (mirror→window).

FIG. 5D is similar to FIG. 5C, except that the sign or polarity of the second material's stress-optic coefficient has been changed from positive to negative. Thus, the first and second materials again have substantially the same refractive index in the cast state before drawing, and the materials are coextruded to form a multilayer cast web, and the cast web is biaxially stretched substantially equally along the x- and y-axes under suitable conditions to induce birefringence in the first and second polymer materials. In the film of FIG. 5D, the biaxial stretching causes the refractive index of the second material to decrease along the x- and y-directions and an increase in the z-direction. The result in the drawn multilayer optical film is large in-plane refractive index mismatches ($\Delta nx$, $\Delta ny$) and a large out-of-plane refractive index mismatch ($\Delta nz$) of opposite polarity or sign, and these mismatches are all much larger than the respective mismatches in the drawn film of FIG. 5C, and thus the reflective power at each layer interface will be greater. If implemented in a microlayer packet with an adequate number of layers, these refractive index relationships can yield a multilayer mirror film. The mirror film may be broad band or narrow band, depending on the layer thickness distribution of the microlayers. It may be internally patterned in a second zone in the same manner as the mirror film of FIG. 5C, and with the same results to provide a transformation from a multilayer mirror film to a multilayer window film (mirror→window).

FIGS. 5E-I depict refractive index relationships for multilayer optical films that may have a window-like reflection characteristic in one or more first (untreated) zones, and a mirror-like reflection characteristic in one or more second (treated) zones. Such a transformation may be considered to be the opposite of the transformations described by FIGS. 5A-D. Thus, a unitary multilayer film having a mirror-like reflective characteristic in one zone and a window-like reflective characteristic (e.g., a substantially clear or transparent appearance) in another zone may be obtained by first fabricating a multilayer optical film having a mirror-like characteristic over its entire area, and then processing the film by the selective application of heat in one or more selected zones to provide a window-like appearance, as explained in connection with FIGS. 5A-D. Alternatively, the same unitary mirror/window multilayer film may be obtained by first fabricating a multilayer optical film having a window-like characteristic over its entire area, and then processing the film by the selective application of heat in one or more selected zones to provide a mirror-like appearance, as explained in connection with the following FIGS. 5E-I.

In FIG. 5E, first and second polymer materials are selected that have substantially the same refractive index in the cast state before drawing, and both materials have positive stress-optic coefficients. The materials are coextruded in an alternating layer arrangement with a suitable number of layers to form a multilayer cast web, having indices shown by the diamond-shaped symbols. The cast web is then biaxially stretched substantially equally along the x- and y-axes under suitable conditions to induce birefringence in the first and second polymer materials. Both materials experience a refractive index increase along the x- and y-directions, and a decrease in the z-direction, and these increases and decreases are very nearly the same for the first and second materials as a result of the materials having substantially similar stress-optic coefficients under the assumed draw conditions. The result in the drawn (stretched) multilayer optical film is refractive indices of the two material layers that are substantially matched along all three principal directions ($\Delta n_x \approx 0$, $\Delta n_y \approx 0$, and $\Delta n_z \approx 0$), even though each material layer is strongly biaxially birefringent. This set of refractive indices, when implemented in a microlayer packet with an adequate number of layers, can provide a multilayer window-like film that has little or no reflectivity for normally incident and obliquely incident light.

The first and second materials of FIG. 5E have different melting or softening points, with that of the first material being lower than that of the second material. Selective heating can therefore be controlled to a temperature that is above the melting or softening point of the first material layer, but below the melting or softening point of the second material layer. In this way, the selective heating causes the first birefringent layers in the second zone to relax to their original isotropic states, or to an intermediate birefringent state if the disorientation is incomplete, while causing the second birefringent layers in the second zone to substantially maintain their birefringence. If relaxation of the first material is complete, the second zone is characterized by substantial and nearly equal refractive index differences in the in-plane directions ($\Delta n_x \approx \Delta n_y$), and a substantial refractive index difference $\Delta n_z$ in the z-direction of opposite polarity or sign. This set of refractive indices, when implemented in a microlayer packet with an adequate number of layers, can provide a multilayer mirror film whose reflectivity for obliquely incident p-polarized light increases with increasing incidence angle. The mirror film may be broad band or narrow band, depending on the layer thickness distribution of the microlayers. The finished film thus combines in a unitary film a multilayer window film in one zone and a multilayer mirror film in a neighboring zone, with microlayers that extend continuously from one zone to the next. For this FIG. 5E, the selective heat treatment process is able to change a multilayer window film to a multilayer mirror film (window→mirror).

FIG. 5F is similar to FIG. 5E, except that the sign or polarity of the first and second materials' stress-optic coefficients have been changed from positive to negative. Thus, the first and second materials again have substantially the same refractive index in the cast state before drawing, and the materials are coextruded to form a multilayer cast web, and the cast web is biaxially stretched substantially equally along the x- and y-axes under suitable conditions to induce birefringence in the first and second polymer materials. In the film of FIG. 5F, the biaxial stretching causes the in-plane refractive indices of the first and second materials to decrease, and the z-axis refractive indices to increase. The magnitude of these decreases and increases are very nearly the same for the first and second materials as a result of the materials having substantially similar stress-optic coefficients under the assumed draw conditions. The result in the drawn (stretched) multilayer optical film is, again, refractive indices of the two material layers that are substantially matched along all three principal directions ($\Delta n_x \approx 0$, $\Delta n_y \approx 0$, and $\Delta n_z \approx 0$), even though each material layer is strongly biaxially birefringent. This set of refractive indices can provide a multilayer window-like film that has little or no reflectivity for normally incident and obliquely incident light. This window film may be internally patterned in a second zone in the same manner as the window film of FIG. 5E so that the first material relaxes to an isotropic state and the second material maintains its birefringence. This results again in a transformation from a multilayer window film to a multilayer mirror film (window→mirror).

FIGS. 5G-I present some typical deviations (of the many possible deviations) from the behavior of FIG. 5E. In FIG. 5G, the second material responds to the selective heat treatment by increasing slightly in birefringence relative to its birefringence in the drawn film. The result is values of $\Delta n_x$, $\Delta n_y$, $\Delta n_z$ in the second (treated) zone that are slightly greater in magnitude than, but otherwise similar to, the corresponding values of FIG. 5E. The slightly greater refractive index differences produce a slightly greater reflectivity at the layer interfaces, and greater reflectivity for a microlayer packet having a given number of layers. FIG. 5H is the converse of FIG. 5G. In FIG. 5H, the second material responds to the selective heat treatment by decreasing slightly in birefringence relative to its birefringence in the drawn film. The result is values of $\Delta n_x$, $\Delta n_y$, $\Delta n_z$ in the second (treated) zone that are slightly smaller in magnitude than, but otherwise similar to, the corresponding values of FIG. 5E. The slightly smaller refractive index differences produce a slightly smaller reflectivity at the layer interfaces, and smaller reflectivity for a microlayer packet having a given number of layers. In FIG. 5I, the first material responds to the selective heat treatment by retaining a small amount of its birefringence, i.e., it does not relax completely to an isotropic state. This results in values of $\Delta n_x$, $\Delta n_y$, $\Delta n_z$ in the second (treated) zone that are slightly smaller in magnitude than, but otherwise similar to, the corresponding values of FIG. 5E. The slightly smaller refractive index differences produce a slightly smaller reflectivity at the layer interfaces, and smaller reflectivity for a microlayer packet having a given number of layers.

Other than the above differences, FIGS. G-I present refractive index relationships representative of a multilayer window film that may be internally patterned in a second zone to produce a multilayer mirror film in the same manner as in FIG. 5E. This results again in a transformation from a multilayer window film to a multilayer mirror film (window→mirror).

FIGS. 5J and 5K depict refractive index relationships for multilayer optical films that may have a window-like reflection characteristic in one or more first (untreated) zones, and a polarizer-like reflection characteristic in one or more second (treated) zones. Such relationships may be achieved using the same or similar coextrudable materials that would be suitable for the window/mirror embodiments of FIGS. 5A-I, but where a constrained uniaxial stretch or the like, or an asymmetric biaxial stretch, is used to produce the multilayer optical film.

In FIG. 5J, first and second polymer materials are selected that have the same or similar isotropic refractive indices, and that have the same or similar stress-optic coefficients (shown as positive in FIG. 5J although negative coefficients may also be used), and that have different melting or softening temperatures. The materials are coextruded in an alternating layer arrangement with a suitable number of layers to form a multilayer cast web, having indices shown by the diamond-shaped symbols. Rather than being biaxially drawn, the cast web of FIG. 5J is then uniaxially stretched along the x-axis (while constraining the film along the y-axis) under suitable conditions to induce birefringence in both the first and second polymer materials. The stretching causes the refractive index values $n1x$ and $n2x$ to increase by similar amounts, while causing $n1z$ and $n2z$ to decrease by similar amounts, and while causing $n1y$ and $n2y$ to remain relatively constant. This results in refractive indices of the two material layers that are substantially matched along all three principal directions ($\Delta nx \approx 0$, $\Delta ny \approx 0$, and $\Delta nz \approx 0$), even though each material layer is strongly biaxially birefringent. This set of refractive indices, when implemented in a microlayer packet with an adequate number of layers, can provide a multilayer window-like film that has little or no reflectivity for normally incident and obliquely incident light.

This multilayer window film can then be internally patterned in a second zone while leaving the window film intact in a first zone. Selective heating by selective delivery of radiant energy to the second zone causes at least some of the birefringent layers in the second zone to relax, becoming less birefringent. In FIG. 5J, the heating is controlled to a temperature that is above the melting or softening point of the first material layer, but below that of the second material layer, so that the first birefringent layers in the second zone relax to their original isotropic states, while the second birefringent layers substantially maintain their birefringence. The second zone is therefore characterized by a relatively large refractive index difference ($\Delta nx$) in one in-plane direction, a zero or near-zero refractive index difference ($\Delta ny$) in the other in-plane direction, and a relatively large out-of-plane refractive index difference ($\Delta nz$) of opposite polarity or sign compared to $\Delta nx$. These refractive index relationships, when implemented in a microlayer packet with an adequate number of layers, can provide a reflective polarizer film in the second zone. This polarizer film has a pass axis parallel to the y-direction and a block axis parallel to the x-direction. The reflection provided by this film for block-state polarized light may be broad band or narrow band, depending on the layer thickness distribution of the microlayers. In either case, the reflectivity of the polarizer film for block-state polarized light (for both the s-polarized component and the p-polarized component) increases with increasing incidence angle due to the opposite polarity of $\Delta nz$. The finished film thus combines in a unitary film a multilayer window film in one zone and a reflective polarizer film in a neighboring zone, with microlayers that extend continuously from one zone to the next. For this FIG. 5J, the selective heat treatment process is able to change a multilayer window film to a multilayer reflective polarizer film (window→polarizer).

FIG. 5K is similar in all respects to FIG. 5J, except for the orientation (stretching) procedure. Rather than using a constrained uniaxial stretch, the index relationships of FIG. 5K assume an asymmetric biaxial stretch—one in which the cast web is stretched different amounts in the x- and y-directions. This causes significant and substantially similar increases in $n1y$ and $n2y$, although these increases are smaller than the increases in $n1x$ and $n2x$. The refractive indices along all three principal directions are substantially matched ($\Delta nx \approx 0$, $\Delta ny \approx 0$, and $\Delta nz \approx 0$), even though each material layer is strongly biaxially birefringent. This set of refractive indices can provide a multilayer window-like film that has little or no reflectivity for normally incident and obliquely incident light.

This multilayer window film can then be internally patterned in a second zone in the same way as in FIG. 5J, so that the first material relaxes to an isotropic state ($n1x=n1y=n1z$), while the second material substantially maintains its birefringence. In this case, the result is substantial values for both of the in-plane refractive index differences $\Delta nx$ and $\Delta ny$ in the second zone, although $\Delta nx$ is significantly larger than $\Delta ny$. The out-of-plane difference $\Delta nz$ is also large, and of opposite polarity or sign relative to $\Delta nx$ and $\Delta ny$. If these refractive index relationships are implemented in a microlayer packet with an adequate number of layers, the result may be an asymmetric reflecting film referred to herein as a partial polarizer. Such a film provides a high degree of reflectivity for normally incident light of one polarization (parallel to the block axis), and a much smaller, yet substantial, degree of reflectivity for normally incident light of the opposite polarization (parallel to the pass axis). The reflectivity can be broad band or narrow band, depending on the layer thickness profile of the microlayer stack. For the processed film of FIG. 5K, the block axis is parallel to the x-axis and the pass axis is parallel to the y-axis. Polarizing films such as this can be particularly useful in certain high efficiency, low loss display applications, for example, and in light recycling and spatial homogenization systems, and in other applications. Reference is made to PCT Publication WO 2008/144656 (Weber et al.), "Backlight and Display System Using Same" for further disclosure of such films, which are referred to in that publication as Asymmetric Reflecting Films (ARF), and applications for such films. At oblique incidence, the reflectivity of both the block state and the pass state for the FIG. 5K film (both the s-pol and p-pol components of each such state) increase with increasing incidence angle. The finished film combines in a unitary film a multilayer window film in one zone and a reflective polarizer film in a neighboring zone, with microlayers that extend continuously from one zone to the next. For this FIG. 5K, the selective heat treatment process is able to change a multilayer window film to a multilayer reflective polarizer film (window→polarizer).

FIG. 5L combines a positively birefringent material with a negatively birefringent material to produce a unitary polarizer/window multilayer optical film. First and second polymer materials are selected that have the same or similar refractive indices in the cast state before drawing, and the materials have stress-optic coefficients of opposite sign or polarity. The materials are coextruded in an alternating layer arrangement with a suitable number of layers to form a multilayer cast web, having indices shown by the diamond-shaped symbols. The cast web is then uniaxially stretched along the x-axis while constraining the film in the y-direction to induce birefringence in the first and second polymer materials. For the first material, the stretching causes a substantial increase in refractive index (n1x) along the x-axis, a substantial decrease in refractive index (n1z) along the z-axis, and little or no increase or decrease in refractive index (n1y) along the y-axis. The second material is opposite: the stretching causes a decrease in index along the x-axis, an increase along the z-axis, and little or no change along the y-axis. The result in the drawn (stretched) multilayer optical film is refractive indices for the two material layers that have a large mismatch $\Delta$nx, a small or zero mismatch $\Delta$ny, and a large mismatch $\Delta$nz of opposite polarity or sign relative to $\Delta$nx. This set of refractive indices, when implemented in a microlayer packet with an adequate number of layers, can provide a reflective polarizer film having a pass axis parallel to the y-axis, a block axis parallel to the x-axis, and a broad band or narrow band (depending on layer thickness profile) reflectivity for block-state polarized light that increases with increasing incidence angle.

This reflective polarizer film can then be internally patterned in a second zone while leaving the reflective polarizer film intact in a first zone. Selective heating by selective delivery of radiant energy to the second zone causes the birefringent layers to relax to their original isotropic states, or to an intermediate birefringent state if the disorientation is incomplete. If relaxation is complete, the second zone can become a multilayer window film with $\Delta$nx$\approx\Delta$ny$\approx\Delta$nz$\approx$0. The reflective characteristic for this portion of the film is virtually no reflection and virtually complete transmission (excluding Fresnel reflections at the two outer surfaces), even though the layer structure of the different material layers is preserved. (In some practical embodiments, refractive index matching may not be perfect, and a small reflectivity may be advantageously detected, e.g. with a spectrophotometer, in at least one polarization state, confirming and revealing details of the preserved multilayer structure.) The finished film thus combines in a unitary film a reflective polarizer film in one zone and a window film in a neighboring zone, with microlayers that extend continuously from one zone to the next. For this FIG. 5L, the selective heat treatment process is able to change a multilayer reflective polarizer film to a multilayer window film (polarizer→window).

The embodiments of FIGS. 5M and 5N make use of a two-step drawing process that is described in U.S. Pat. No. 6,179,948 (Merrill et al.). In this process, the stretching or orientation of the cast film is carried out using a two-step drawing process that is carefully controlled so that one set of layers (e.g., the first material layer of each optical repeat unit) substantially orients during both drawing steps, while the other set of layers (e.g., the second material layer of each optical repeat unit) only substantially orients during one drawing step. The result is a multilayer optical film having one set of material layers that are substantially biaxially oriented after drawing, and having another set of material layers that are substantially uniaxially oriented after drawing. The differentiation is accomplished by leveraging the different visco-elastic and crystallization characteristics of the two materials by using one or more suitably different process conditions such as temperature, strain rate, and strain extent for the two process drawing steps. Thus, for example, a first drawing step may substantially orient the first material along a first direction while at most only slightly orienting the second material along this direction. After the first drawing step, one or more process conditions are suitably changed such that in a second drawing step, both the first and the second materials are substantially oriented along a second direction. Through this method, the first material layers can assume an essentially biaxially-oriented character (for example, the refractive indices may satisfy the relationship n1x$\approx$n1y$\neq$n1z, sometimes referred to as a uniaxially birefringent material), while the second material layers in the very same multilayer film can assume an essentially uniaxially-oriented character (for example, the refractive indices may satisfy the relationship n2x$\neq$n2y$\neq$n2z$\neq$n2x, sometimes referred to as a biaxially birefringent material).

With this background, FIG. 5M depicts an embodiment in which the first and second polymer materials are selected to have the same or similar isotropic refractive indices, and to both become birefringent after drawing, and to have the same polarity of stress-optic coefficient (in the drawing they are both depicted as positive, but they can instead both be negative). The first and second materials have different melting or softening temperatures, and have different visco-elastic and/or crystallization characteristics such that the two-step drawing process discussed above can be implemented. The materials are coextruded in an alternating layer arrangement with a suitable number of layers to form a multilayer cast web, having indices shown by the diamond-shaped symbols. The cast web is then biaxially stretched along the x- and y-axes using the above-described two-step process, such that the first material is oriented comparably along both the x- and y-axes, whereas the second material is oriented preferentially along the y-axis, with lesser orientation (including in some cases no orientation) along the x-axis. The net result is a multilayer optical film whose first and second microlayers are both birefringent, but the first material layers have a substantially biaxially-oriented character, whereas the second material layers have an asymmetric biaxially-oriented character, or even a substantially uniaxially-oriented character. As shown, the materials and process conditions are selected so that the stretching causes the refractive index values n1x and n1y to increase by similar amounts, while causing n1z to decrease by a larger amount. The stretching also causes the refractive index value n2y to increase to a value equal to or close to that of n1x and n1y, and causes the refractive index n2z to decrease, and causes the refractive index n2x to remain about the same (if the second material orients to a small degree during the x-axis orientation step, then n2x may increase slightly as shown in the figure). This results in refractive indices of the two material layers that have one large in-plane refractive index mismatch ($\Delta$nx), one significantly smaller in-plane refractive index mismatch ($\Delta$ny$\approx$0), and an intermediate out-of-plane refractive index mismatch ($\Delta$nz) of opposite polarity from $\Delta$nx. When the second material orients more biaxially, index matching in the x-direction after treatment may be achieved by pairing with a first material whose isotropic index is higher than the second. This set of refractive indices, when implemented in a microlayer packet with an adequate number of layers, can provide a reflective polarizer film with a block axis along the x-direction and a pass axis along the y-direction. The reflection provided by the film (for light polarized parallel to the block axis) may be broad band or narrow band, depending on the layer thickness distribution of the microlayers. This reflective polarizer film maintains high reflectivity with increasing incidence angle due to the z-index mismatch of opposite polarity.

This multilayer polarizer film can then be internally patterned in a second zone as described above, while leaving the reflective polarizer film intact in a first zone. Selective heating by selective delivery of radiant energy to the second zone causes at least some of the birefringent layers to relax, becoming less birefringent. In the present case, the heating is carefully controlled to a temperature that is above the melting or softening point of the second material layers, but below the melting or softening point of the first material layers. In this way, the selective heating causes the second birefringent layers in the second zone to relax to their original isotropic states, or to an intermediate birefringent state if the disorientation is incomplete, while causing the first birefringent layers in the second zone to substantially maintain their birefringence. If relaxation of the second material is complete, the second zone is characterized by relatively large in-plane refractive index mismatches ($\Delta nx$ and $\Delta ny$), and a large out-of-plane refractive index difference ($\Delta nz$) of opposite polarity or sign compared to $\Delta nx$ and $\Delta ny$. These refractive index relationships, when implemented in a microlayer packet with an adequate number of layers, can provide a multilayer mirror film in the second zone. The reflectivity of the mirror film may be broad band or narrow band, depending on the layer thickness profile of the microlayer stack. The mirror film provides increased reflectivity with increasing incidence angle due to the opposite polarity of the z-index mismatch $\Delta nz$. The finished film thus combines in a unitary film a multilayer reflective polarizer film in one zone and a multilayer mirror film in a neighboring zone, with microlayers that extend continuously from one zone to the next. For this FIG. 5M, the selective heat treatment process is able to change a multilayer reflective polarizer film to a multilayer reflective mirror film (polarizer→mirror).

FIG. 5N shares many similarities with FIG. 5M even though it produces a very different reflective characteristic when it is selectively heat treated. In FIG. 5N, the first and second polymer materials initially have the same or similar isotropic refractive indices, and are coextruded to form a cast web, and are oriented using the two-step process to provide a multilayer optical film having one large in-plane refractive index mismatch ($\Delta nx$), one significantly smaller in-plane refractive index mismatch ($\Delta ny \approx 0$), and an intermediate out-of-plane refractive index mismatch ($\Delta nz$) of opposite polarity from $\Delta nx$. With an adequate number of microlayers in the stack, these refractive index relationships produce a first reflective polarizer film as described in connection with FIG. 5M.

A significant difference between FIG. 5N and FIG. 5M is that the melting or softening temperatures of the first and second materials are reversed. In FIG. 5N, the melting or softening temperature of the first material is assumed to be lower than that of the second material. With this change, the selective heating by selective delivery of radiant energy to the second zone can be controlled so that the first material layers lose all or substantially all of their birefringence, while the second material layers retain their birefringence. The second zone is then characterized by a substantial refractive index mismatch $\Delta ny$ along the y-axis, a substantial refractive index mismatch $\Delta nz$ along the z-axis, of opposite polarity or sign compared to $\Delta ny$, and little or no refractive index mismatch $\Delta nx$ along the x-axis. These refractive index relationships, when implemented in a microlayer packet with an adequate number of layers, can provide a second reflective polarizer film in the second zone. Notably, this second polarizer has a pass axis parallel to the x-direction and a block axis parallel to the y-direction, i.e., it is perpendicularly oriented relative to the first reflective polarizer. The reflection provided by this second polarizer film for block-state polarized light will be broad band or narrow band, depending on the layer thickness distribution of the microlayers, to the same extent that the first reflective polarizer is broad band or narrow band for the orthogonal polarization state. In any case, the reflectivity of the second polarizer film for block-state polarized light (for both the s-polarized component and the p-polarized component) increases with increasing incidence angle due to the opposite polarity of $\Delta nz$ in the second zone. The finished film thus combines in a unitary film a first reflective polarizer film in one zone and a second reflective polarizer film in a neighboring zone, the second reflective polarizer film being oriented perpendicular to the first reflective polarizer film, with microlayers that extend continuously from one zone to the next. For this FIG. 5N, the selective heat treatment process is able to change a first multilayer reflective polarizer film to a second multilayer reflective polarizer film (polarizer1→polarizer2).

The above examples should not be considered to be limiting. They are only some of the many different material combinations contemplated herein for internally patterned multilayer optical films. We contemplate that the different birefringent materials of the multilayer optical film may be stretched and oriented so that the drawn states of the refractive indices can be selectively matched or mismatched in any combination along one, some, or all of the principal x, y, z directions.

A particularly interesting set of cases, of which FIGS. 5E-K are examples, comprises material combinations and stretching conditions that result in a drawn film that is substantially index matched along all three principal directions, and thus also result in a drawn film that appears optically clear to visual inspection or to a machine inspection system, for example. The subsequent treatment in one or more selected zones of the film can then be considered to effectively "turn on," or activate, the otherwise "dormant" optical reflectivity of the underlying multi-layer structure. The reduction in anisotropy or birefringence in one material relative to the other can be used to create the refractive index differences that provide the reflectivity in the treated zone, whether in a mirror-like fashion or a polarizer-like fashion, or otherwise. In this manner, clear films can be made to exhibit reflective properties, and if desired these reflective properties may result in an observable color. The apparent color in the treated zones may be a function of the reflective properties of one or more backings that may be used with the multilayer optical film, as well as the general lighting conditions.

Articles that exhibit the material properties of FIGS. 5E-K can thus be used to provide an initially clear (window-like) multilayer film, that may appear to be a monolithic clear polymer film until it is processed. After processing, the film may become a colored reflector over those portions of the film over which the film has been "written" (processed), e.g. by a laser. In this manner, a clear film can have colored spots or other designs written into it. The color is derived from the inherent reflectivity of the now activated optical packet.

The issue of what constitutes "substantial index matching" for purposes of making the initial clear-appearing doubly birefringent multilayer film may be a function of bandwidth choice, dispersion characteristics, and how close a match is needed given the level of index differences (i.e., the likely imperfect matching) and number of layer pairs in the optical packet (and the optical power of the packet) relative to the visual acceptability or other acceptability metric for a given application. One way to characterize the degree to which the materials have matching refractive indices in all principal directions is to compare the greatest layer-to-layer mismatch to the amount of birefringence in one or both layers. Thus, we may refer to "the birefringence" of a given material as the difference between that material's maximum refractive index (e.g. along one principal axis) and that same material's minimum refractive index (along a different principal axis). For example, if a first material has n1x=1.65, n1y=1.60, and n1z=1.55, we may describe it as having a birefringence of 0.10 (=1.65-1.55). The layer-to-layer refractive index mismatches between this first birefringent material and a second birefringent material (which has a second birefringence that may be different from the first birefringence) are expressed as Δnx, Δny, Δnz along the x-, y-, and z-axes as described earlier. If we refer to the greatest magnitude of Δnx, Δny, and Δnz as ΔnMax, then we may use it to characterize the degree to which the first and second materials have matching indices. The parameter ΔnMax may thus refer to the largest layer-to-layer refractive index mismatch that can be found after evaluating all of the principal directions. We may then specify, for example, that ΔnMax is smaller than some factor multiplied by the greater of the first birefringence and the second birefringence, where the factor may be 0.1, for example. In practical embodiments having a reasonable number of microlayers, we may specify that Δnx, Δny, and Δnz each have a magnitude less than 0.03 or 0.01, for example.

A further subset or class of particularly interesting cases comprises not only material combinations and stretching conditions that result in a drawn film that is substantially index matched along all three principal directions, but also wherein the materials have isotropic indices that are also substantially matched. In these cases, the doubly birefringent multilayer optical film, which initially appears clear, can be selectively heat treated to produce one or more zones of increased reflectivity and color, if desired. (The increased reflectivity in this case is a result of one material exhibiting a greater decrease in its birefringence than the other material.) The treated (reflective) zones of such a film, or portions thereof, can then be heat treated again to an extent that causes both materials to become substantially isotropic. The second treatment, which in some cases may be referred to as an over-treatment, results in the relaxation of both materials and the re-capture of the clear state (window→mirror→window). In over-treatment situations, rapid quenching may be desirable to ameliorate haze in the over-treated portion or zone. In other instances, the over-treatment can be used to impart haze and scattering to create an additional optical effect.

The reader is again reminded that a multitude of possible combinations of reflector types for the first zone and reflector types for the second zone can be selected, and the embodiments described in connection with FIGS. 5A-N demonstrate only some such combinations and should not be considered to be limiting. Not just positively birefringent but also negatively birefringent materials, and combinations thereof, can be used. In cases where the combination of a birefringent and isotropic polymer is used, the birefringent polymer may have a pre-stretch isotropic refractive index that is less than, greater than, or equal to the refractive index of the isotropic polymer. In fact, the pre-stretch isotropic refractive indices of the materials, regardless of the type of materials used, may be matched or substantially matched, or may be substantially mismatched as needed to produce the desired reflective characteristics in the finished film.

Figure 6:
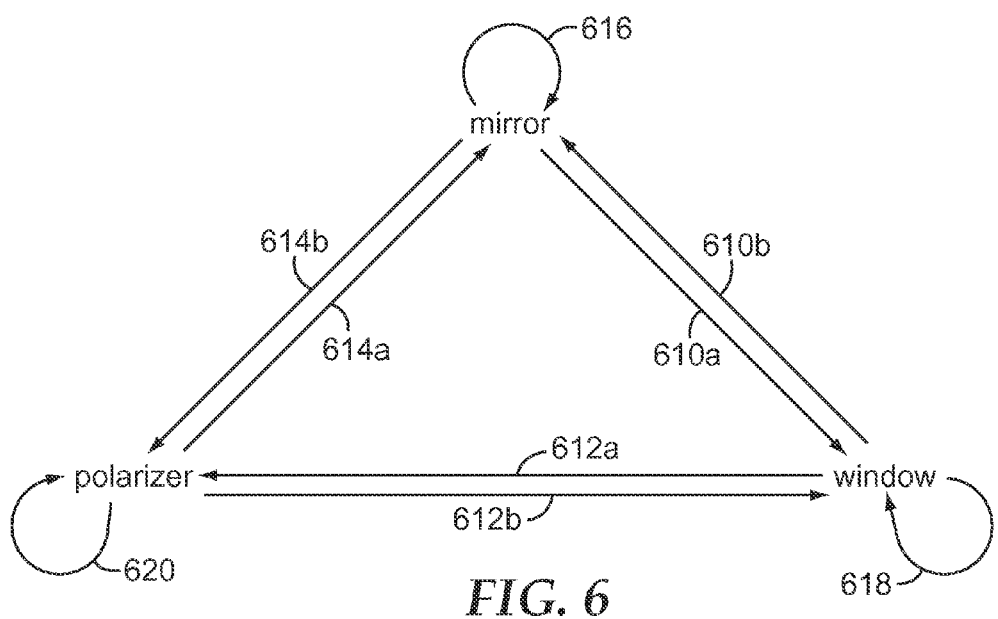
FIG. 6 is a schematic diagram that summarizes various transformations that can be achieved using the techniques discussed herein for multilayer optical films.

FIG. 6 is a schematic diagram that summarizes various transformations that can be achieved using the birefringent-relaxation techniques discussed herein for doubly birefringent multilayer optical films. As such, the diagram also summarizes a variety of combinations of reflector types for the first (untreated) zone and the second (heat treated) zone of an internally patterned multilayer optical film. The arrows in the figure represent transformations from a first reflective characteristic to a second reflective characteristic that differs substantially from the first reflective characteristic. Note that the diagram of FIG. 6 is provided for illustrative purposes and should not be construed as limiting.

Arrow 610a represents a transformation from a multilayer mirror film to a multilayer window film, e.g., as described in connection with FIGS. 5A-D. Such a transformation can be used to provide an internally patterned multilayer optical film with one or more first (untreated) zones characterized by a mirror film and one or more second (treated) zones characterized by a window film. Arrow 610b represents an opposite transformation, from a multilayer window film to a multilayer mirror film, e.g., as described in connection with FIGS. 5E-I. Such a transformation can be used to provide an internally patterned multilayer optical film with one or more first (untreated) zones characterized by a window film and one or more second (treated) zones characterized by a mirror film.

Arrow 612a represents a transformation from a multilayer window film to a multilayer polarizer film, e.g., as described in connection with FIGS. 5J and 5K. Such a transformation can be used to provide an internally patterned multilayer optical film with one or more first (untreated) zones characterized by a window film and one or more second (treated) zones characterized by a polarizer film. Arrow 612b represents an opposite transformation, from a multilayer polarizer film to a multilayer window film, e.g., as described in connection with FIG. 5L. Such a transformation can be used to provide an internally patterned multilayer optical film with one or more first (untreated) zones characterized by a polarizer film and one or more second (treated) zones characterized by a window film.

Arrow 614a represents a transformation from a multilayer polarizer film to a multilayer mirror film, e.g., as described in connection with FIG. 5M. Such a transformation can be used to provide an internally patterned multilayer optical film with one or more first (untreated) zones characterized by a polarizer film and one or more second (treated) zones characterized by a mirror film. Arrow 614b represents an opposite transformation, from a multilayer mirror film to a multilayer polarizer film. Such a transformation can be used to provide an internally patterned multilayer optical film with one or more first (untreated) zones characterized by a polarizer film and one or more second (treated) zones characterized by a window film.

Arrows 616, 618, and 620 represent transformations from one type of mirror to another type of mirror, from one type of window to another type of window, and from one type of polarizer to another type of polarizer (see e.g. FIG. 5N). Window-to-window type transformations (window1->window2) may be achieved using any of the refractive index transformations discussed above (including but not limited to those depicted in FIGS. 5A-N), but where the number of layers used in the microlayer stack is small enough so that, for any given layer-to-layer refractive index difference, the stack provides a low enough reflectivity to be considered a window-like reflective characteristic. Recall from the discussion above that very faint reflectivities can be detected with an instrument such as a spectrophotometer even in cases where the film appears to be substantially clear or transparent to the ordinary observer. The reader is again reminded that the diagram of FIG. 6 is provided for illustrative purposes and should not be construed in a limiting fashion.

At this point, after having reviewed FIGS. 5A-N and FIG. 6, the reader will appreciate that the selective heat treatment discussed herein to reduce the birefringence of at least some of the layers in a multilayer optical film can be used to "turn on" the multilayer optical film, i.e., change it from an initial reflectivity (for at least one polarization state), which may be relatively low, to a substantially higher reflectivity, or it can be used to "turn off" the multilayer optical film, i.e., change it from an initial reflectivity (for at least one polarization state), which may be relatively high, to a substantially lower reflectivity. Stated differently, the selective heat treatment can be used to increase the refractive index mismatch along one or more axes between layers in an optical repeat unit, or it can be used to decrease the refractive index mismatch.

Figure 7:
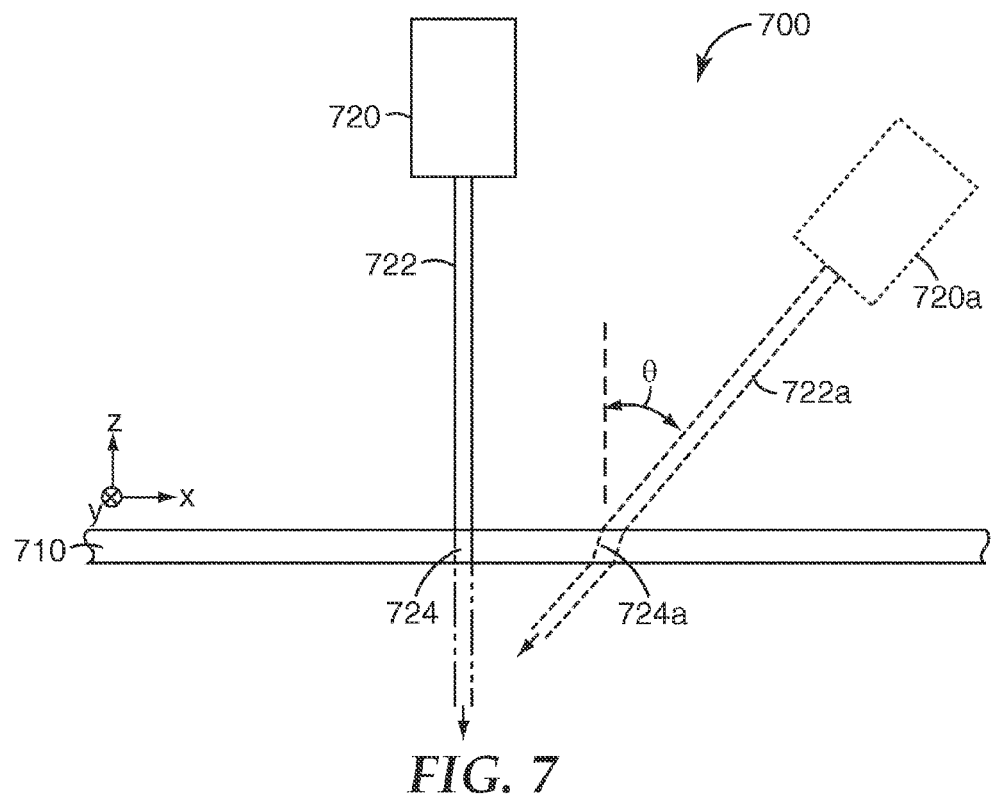
FIG. 7 is a schematic side view of an arrangement for selectively heating a multilayer optical film to accomplish internal patterning.

In FIG. 7, we show one arrangement 700 that can be used to selectively heat the second zone of the multilayer optical films to provide the disclosed internally patterned films. Briefly, a multilayer optical film 710 is provided that comprises at least one microlayer packet that extends throughout the film, or at least from a first to a second zone thereof. The microlayers are internal to the film and provide the film with a first reflective characteristic. A high radiance light source 720 provides a directed beam 722 of suitable wavelength, intensity, and beam size to selectively heat an illuminated portion 724 of the film by converting some of the incident light to heat by absorption. Preferably, the absorption of the film is great enough to provide sufficient heating with a reasonably-powered light source, but not so high that an excessive amount of light is absorbed at the initial surface of the film, which may cause surface damage. This is discussed further below. In some cases it may be desirable to orient the light source at an oblique angle θ, as shown by the obliquely positioned light source 720a, directed beam 722a, and illuminated portion 724a. Such oblique illumination may be desirable where the multilayer optical film 710 contains a microlayer packet having a reflection band at normal incidence that substantially reflects the directed beam 722 in a way that prevents the desired amount of absorption and concomitant heating. Thus, taking advantage of the shift of the reflection band to shorter wavelengths with increasing incidence angle, the directed beam 722a can be delivered at an oblique angle θ that avoids the (now shifted) reflection band to allow the desired absorption and heating.

In some cases, the directed beam 722 or 722a may be shaped in such a way that the illuminated portion 724 or 724a has the desired shape of the finished second zone. In other cases, the directed beam may have a shape that is smaller in size than the desired second zone. In the latter situation, beam steering equipment can be used to scan the directed beam over the surface of the multilayer optical film so as to trace out the desired shape of the zone to be treated. Spatial and temporal modulation of the directed beam can also be utilized with devices such as beam splitters, lens arrays, pockels cells, acousto-optic modulators, and other techniques and devices known to those of ordinary skill in the art.

Figure 8A:
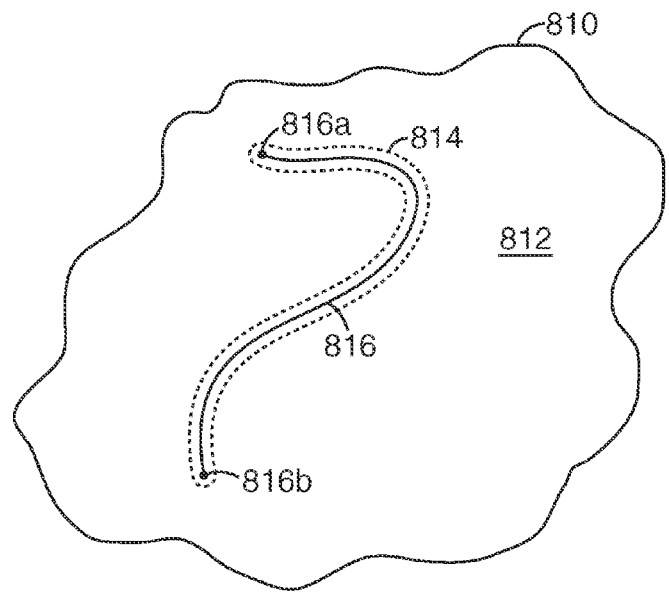
FIGS. 8A-C are schematic top views of different second zones of a patterned multilayer film, and superimposed thereon possible paths of a light beam relative to the film capable of forming the depicted zones.
Figure 8B:
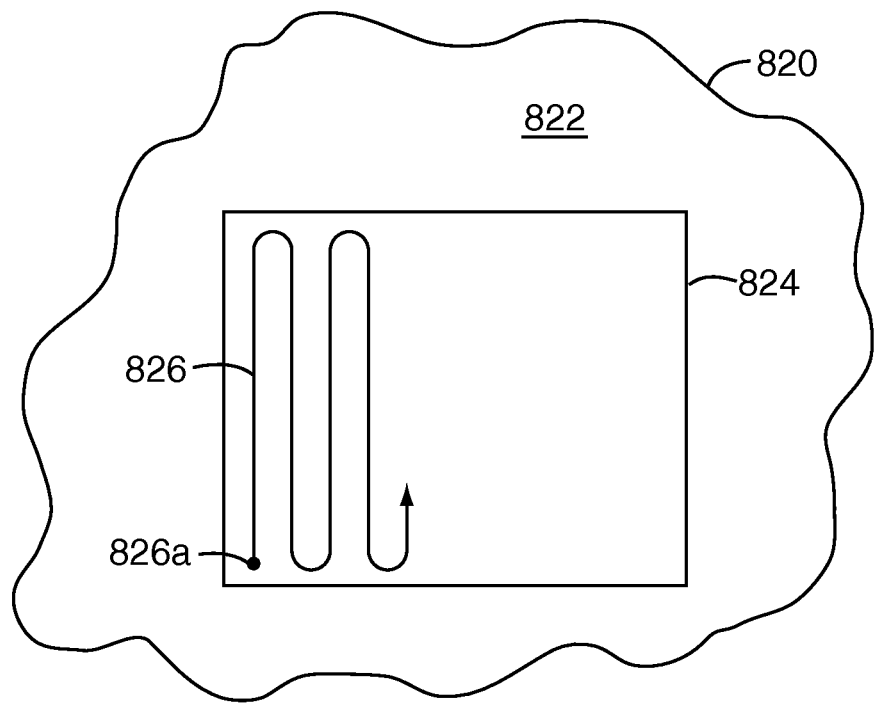
Figure 8C:
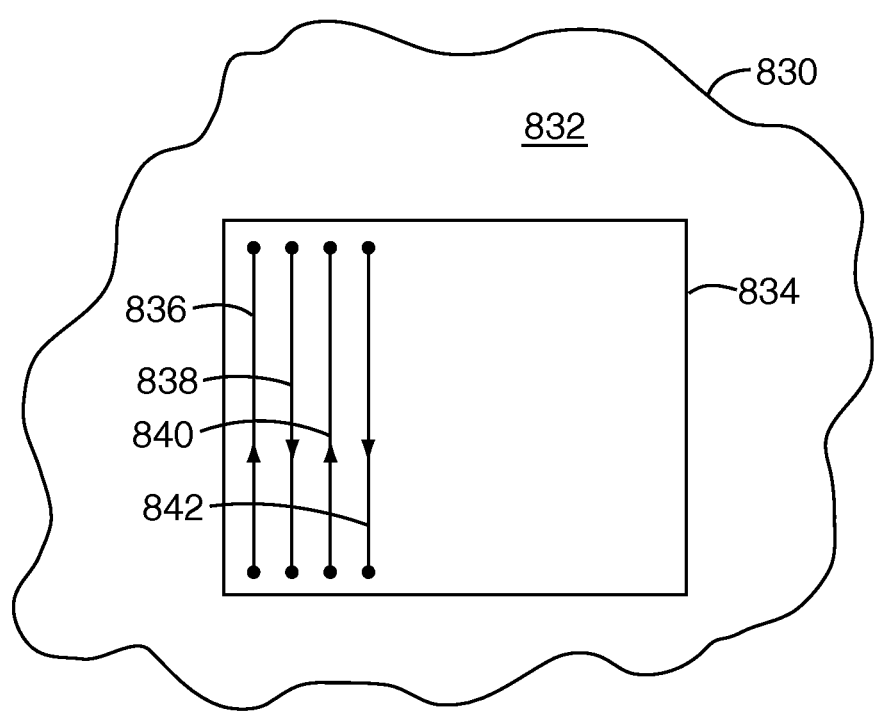

FIGS. 8A-C provide schematic top views of different second zones of a patterned multilayer film, and superimposed thereon possible paths of a directed light beam relative to the film capable of forming the depicted zones. In FIG. 8A, a light beam is directed at a multilayer optical film 810 and scanned at a controlled speed from a starting point 816a to an ending point 816b along a path 816 to selectively heat the film in an arbitrarily-shaped zone 814 to distinguish it from a first zone 812. FIGS. 8B and 8C are similar. In FIG. 8B, a light beam is directed at a multilayer optical film 820 and scanned at a controlled speed from a starting point 826a along a path 826 to selectively heat the film in a rectangular-shaped zone 824 to distinguish it from a neighboring first zone 822. In FIG. 8C, a light beam is directed at a multilayer optical film 830 and scanned at controlled speeds along the discontinuous paths 836-842, and so on, to selectively heat the film in a rectangular-shaped zone 834 to distinguish it from a neighboring first zone 832. In each of FIGS. 8A-C, the heating is sufficient to reduce or eliminate birefringence of at least some interior microlayers in the second zone while maintaining the birefringence of those layers in the first zone, and is accomplished while maintaining the structural integrity of the microlayers in the second zone and without any selective application of pressure to the second zone.

Figure 9A:
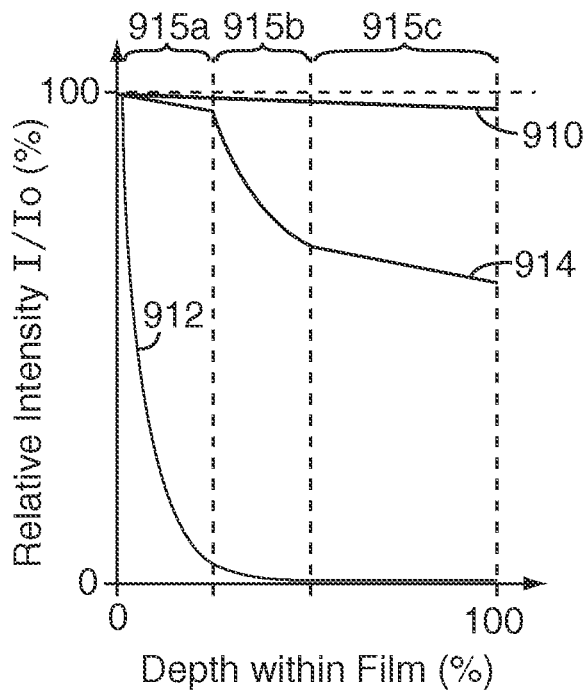
FIG. 9A is an idealized plot showing the relative intensity of a beam of light as a function of the depth the light beam propagates into the film, with three curves provided for three different multilayer optical films.
Figure 9B:
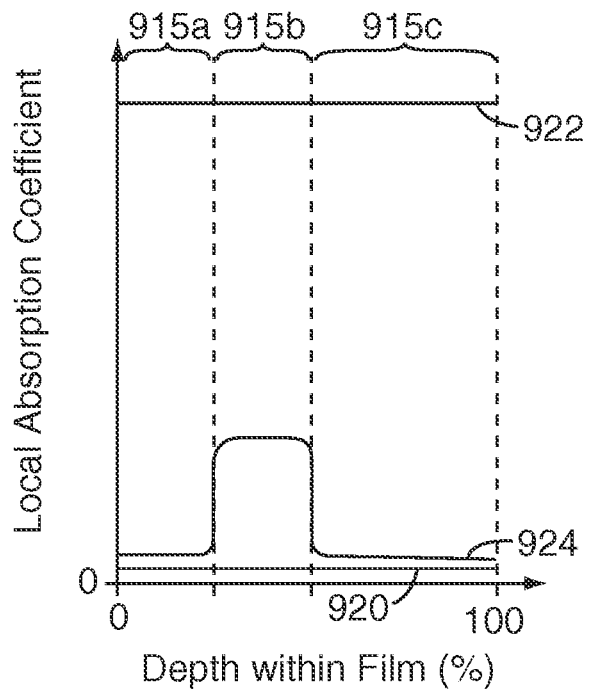
FIG. 9B is an idealized plot showing the local absorption coefficient as a function of the depth or axial position within the film, with three curves corresponding to the three curves of FIG. 9A.

FIGS. 9A and 9B address the topic of how the absorption of the multilayer optical film can or should be tailored to provide optimal localized heating. The graphs of FIGS. 9A and 9B are plotted on the same horizontal scale, which represents the depth or position of the radiant light beam as it propagates through the film. A depth of 0% corresponds to the front surface of the film, and a depth of 100% corresponds to the rear surface of the film. FIG. 9A plots along the vertical axis the relative intensity $I/I_0$ of the radiant beam. FIG. 9B plots the local absorption coefficient (at the selected wavelength or wavelength band of the radiant beam) at each depth within the film.

Three curves are plotted in each figure, for three different multilayer optical film embodiments. In a first embodiment, the film has a substantially uniform and low absorption throughout its thickness at the wavelength of the directed light beam. This embodiment is plotted as curve 910 in FIG. 9A and curve 920 in FIG. 9B. In a second embodiment, the film has a substantially uniform and high absorption throughout its thickness. This embodiment is plotted as curve 912 in FIG. 9A and curve 922 in FIG. 9B. In a third embodiment, the film has a relatively low absorption throughout regions 915a and 915c of its thickness, but has a higher, intermediate absorption in region 915b of its thickness.

The first embodiment has an absorption coefficient that is too low for many situations. Although the directed light beam is absorbed uniformly as a function of depth as indicated by the constant slope of the curve 910, which may be desirable in some cases, very little of the light is actually absorbed as shown by the high value of the curve 910 at a depth of 100%, meaning that a high percentage of the directed light beam is wasted. Nevertheless, in some cases this first embodiment may still be quite useful in the treatment of some films. The second embodiment has an absorption coefficient that is too high for many situations. Although substantially all of the directed light beam is absorbed, and none is wasted, the high absorption causes an excessive amount of light to be absorbed at the front surface of the film, which may cause surface damage to the film. If the absorption is too high, an adequate amount of heat cannot be delivered to interior layers of interest without damaging layers at or near the front surface of the film. The third embodiment utilizes a non-uniform absorption profile that may be achieved, for example, by incorporating an absorbing agent into selected interior layers of the film. The level of absorptivity (controlled by the local absorption coefficient) is desirably set to an intermediate level so that an adequate portion of the directed light beam is absorbed in the tailored absorbing region 915b of the film, but the absorptivity is not so high that an excessive amount of heat is delivered to the incident end of the region 915b relative to the opposite end. In many instances, the absorptivity in absorbing region 915b is still reasonably weak, e.g. the relative intensity profile 914 over that region may appear more as a straight line with merely a steeper slope than the other regions, e.g. 915a and 915c. As further described later, the adequacy of the absorption is determined by balancing that absorptivity against the power and duration of the incoming directed light beam to achieve the desired effect.

In an elementary example of the third embodiment, the multilayer film may have a construction of two thick skin layers with one or more packets of microlayers therebetween (separated by protective boundary layers if two or more microlayer packets are included), and the film may be composed of only two polymer materials A and B. An absorbing agent is incorporated into polymer material A to increase its absorptivity to a moderate level but no absorbing agent is incorporated into polymer B. Both materials A and B are provided in alternating layers of the microlayer packet(s), but the skin layers and the protective boundary layers, if present, are composed only of polymer B. Such a construction will have a low absorptivity at the outer surfaces, i.e. the skin layers, of the film, due to the use of the weakly absorbing material B, and will also have a low absorptivity at the optically thick PBLs if they are present. The construction will have a higher absorptivity in the microlayer packet(s) due to the use of the more strongly absorbing material A in alternating microlayers (along with alternating microlayers of the more weakly absorbing material B). Such an arrangement can be used to preferentially deliver heat to interior layers of the film, in particular to the interior microlayer packet(s), rather than to outer surface layers. Note that with an appropriately designed feedblock the multilayer optical film can comprise three or more different types of polymer materials (A, B, C, . . . ), and an absorptive agent may be incorporated into one, some, or all of the materials in order to provide a wide variety of different absorption profiles so as to deliver heat to selected interior layers, packets, or regions of the film. In other cases, it may be useful to include an absorbing agent in the PBL(s) or even in the skin layer, if present. In either case, the loading or concentration may be same or different, either higher or lower, than in the microlayers.

Similar absorption profiles as those of the foregoing embodiments may be obtained using the inherent absorption characteristics of the various native materials used in the multilayer optical film. Thus, the multilayer film construction may comprise different materials having different absorption characteristics among the various layers or packets of the film, and those various layers or packets may have been formed together during film formation (e.g. by coextrusion), or may have been formed as separate precursor films which were later combined e.g. by lamination.

The foregoing disclosure may be considered to describe, among other things, "write-able" doubly birefringent multilayer optical films that can be altered by noncontact, radiative means after its initial manufacture. The multilayer optical film (MOF) may comprise at least two materials of alternating layers and at least one optical packet of such layers tuned to reflect a selected portion of the spectrum, such as a visible spectral band, at a first selected angle of incidence, furthermore optionally comprising an absorbing agent which may for purposes of the present discussion be referred to as a third material, dispersed in either or both layers of a selected optical packet, that preferentially absorbs electro-magnetic radiation not principally reflected by the MOF reflective band at a second selected angle of incidence nor significantly absorbed by the other materials of the MOF. We also disclose a process using a directed radiant energy treatment of a specified spectral band to selectively melt and disorient in part or in whole, at least one birefringent material in the optical packet containing the absorbing material in order to reduce or eliminate the birefringence in these layers. The treatment is applied to chosen spatial locations across the film plane. Also disclosed is the finished optical film itself with the spatially tailored optical variations after treatment. The disclosed films can be used in business processes in which an originally uniformly cast and drawn optical body is spatially tailored to conform to the individual requirements of a given application.

One aspect of particular interest is the controlled spatial patterning of multilayer optical films containing, for example, near-IR absorbing dyes or other absorbing agents by selectively removing the birefringence of chosen interior optical layers while leaving other interior or surface layers relatively unchanged by subsequent treating with pulsed IR laser sources or other suitable high radiance light sources.

The films disclosed herein (both prior to selective heat treatment and after selective heat treatment), in which the birefringence of at least some of its internal microlayers can be reduced in one or more zones of the film to provide a second reflective characteristic, different from the initial or first reflective characteristic, may be referred to as STOF: Spatially Tailored Optical Films.

The films, methods, and business processes may be generally useful in any application in which a spatially controlled level of orientation is desired. Fields of interest may include, for example, display, decorative, and security applications. Some applications may overlap multiple fields. For example, some articles may incorporate the internally patterned films disclosed herein in combination with a film, substrate, or other layer that includes conventional patterning in the form of indicia, for example. The resulting article may be useful in security applications, but versions of it may also be considered decorative. Selectively heat treating such an article may produce zones in the internally patterned film that selectively obstruct (by increasing reflectivity) or reveal (by decreasing reflectivity) portions of the conventional patterning of the other film, depending on the design of the internally patterned film. Color shifting characteristics of the disclosed internally patterned films may also be exploited in combination with colored or black-and-white background indicia as disclosed for example in U.S. Pat. No. 6,045,894 (Jonza et al.) "Clear to Colored Security Film", and U.S. Pat. No. 6,531,230 (Weber et al.) "Color Shifting Film".

Further in regard to security applications, the disclosed films may be used in a variety of security constructions including identification cards, driver's licenses, passports, access control passes, financial transaction cards (credit, debit, pre-pay, or other), brand protection or identification labels, and the like. The film may be laminated or otherwise adhered as interior or exterior layers to other layers or portions of the security construction. When the film is included as a patch, it may cover only a portion of the major surface of the card, page, or label. In some cases, it may be possible to use the film as the base substrate or the only element of the security construction. The film may be included as one of many features in the security construction such as holograms, printed images (intaglio, offset, barcode, etc.), retroreflective features, UV or IR activated images and the like. In some instances, the disclosed films may be layered in combination with these other security features. The film may be used to provide a personalizable feature to the security construction, for example, a signature, an image, an individual coded number, etc. The personalizable feature may be in reference to the individual document holder or a specific product entity, such as in the case of a manufacturer tag, a lot verification tag, a tamper-proof coding, or the like. The personalizable feature can be made with a variety of scanning patterns including lines and dot patterns. Patterns can be the same or different among writable packets, depending on the film construction.

Consider, for example, the case of a first writable packet that initially exhibits a perceptible color but then becomes clear upon treatment or patterning. One or more such color packets can be used. Consider the addition of a second multilayer optical film packet to form the film construction to be included in the security construction. Patterning or writing the first packet will create a design or image in the color of the second packet in a background representing the color characteristics of the two packets combined. When the spectral bands are sufficiently narrow, both the foreground (patterned area) and background can color shift with viewing angle. The variation of the perceived color with background, e.g. white or black backgrounds, to favor transmitted or reflected light viewing can be used as a security feature. For example, a page or leaf of the film in a document, such as a passport, can be flipped to view the film against different backgrounds or portions of the document.

The film may provide both overt (e.g. clearly visible to an ordinary observer) and covert security features to the security construction. For example, a writable (color) reflective polarizer layer can provide a covert feature viewable with a polarizing analyzer, e.g. a feature that changes color or disappears depending on the polarization state of the analyzer. An infrared reflecting packet can be patterned to make an IR detectable, e.g. machine readable, personalized coding feature.

A particularly interesting film construction for security applications is a very far red or near IR reflector, e.g., with a lower (left) reflection band edge between 650 and 800 nm (depending on film construction) as described in U.S. Pat. No. 6,045,894 (Jonza et al.), which can provide a clear-to-colored appearance as the observation angle changes from normal incidence to glancing incidence. Other interesting constructions, including optical polarizing films with designed color shifts, are described in U.S. Pat. No. 7,064,897 (Hebrink et al.). Using the patterning methods of the present application, films such as those described in the '894 Jonza reference and those described in the '897 Hebrink reference can be made that are writable, for example, with a laser. For example, personalized information can be written into such a film by the alteration of reflection packets in the visible, UV, or IR portion of the spectrum, where the altered portions (treated zones) of the film may have a lower reflectivity than untreated portions of the film, or vice versa.

Finally, it should be noted that many of the features described here for security applications are likewise useful for decorative applications. For example, a personalized logo can be thus embedded in a consumer article.

Doubly birefringent multilayer optical films may include at least one selected reflection band for at least one state of linear polarization formed by at least one selected packet of optical interference layers, which may comprise a radiatively absorbing material. The patterning method allows the removal or reduction of the birefringence among a selected set of material layers thus altering the interference characteristics of the optical stack over a selected spectral band. In this manner, the film may be spatially tailored for a desired application, e.g. a pixilated display. The optical film can thus be made to be spatially changing color filters, or can be made to vary between transmissive, reflective mirror and/or reflective polarizers, or in combination of color filtering and these reflective states, or strengths or quality of these states (e.g. from a strong to weak mirror, or from a polarizer or partial polarizer to a mirror). One useful application may be color filters used in liquid crystal display (LCD) devices. Another application may be to use the disclosed materials and techniques to create or "write" structures in the interior or inside of films and similar optical bodies for purposes besides or in addition to wavelength-selective transmission or reflection. The spatial tailoring of optical properties and materials described herein may be used to effect a light guiding structure inside film, for instance bringing the guide through the film and intermittently drawing to the surface. The combination of anisotropic and selectively absorbing materials and laser writing process can produce highly functioning optical structures with the added processing advantage of using longer laser pulse widths, reduced numeric aperture, and potentially greater speed of writing.

A particularly useful class of constructions is a polymeric optical body comprising two or more sets of optically functional layers, each set having a similar function (e.g. optical transform, whether it be reflection or transmission, for example) but wherein each particular set is included to act on a particular portion of the spectral band. At least one set may comprise radiant absorbers, and at least one other set does not. In some cases, more than one set may comprise radiant absorbers. For example, a multilayer optical film may comprise two or more optical interference packets. These packets (sets of optically functional layers) may comprise many layers of alternating materials. One optical packet may contain radiant absorbers and another may not.

A variety of optical absorbers can be used. For optical films operating in the visible spectrum, ultraviolet and infrared absorbing dyes, pigments, or other additives may be useful. It may be desirable to choose a spectral range for absorption that is not highly absorbed by the polymers of the construction. In this manner, the directed radiation can be concentrated in the selected regions of interest throughout the thickness of the optical body. The absorbers are desirably melt extrudable so that they can be embedded in the selected layer set of interest. To this end, the absorbers should be reasonably stable at the processing temperatures and residence times required for extrusion.

The disclosed doubly birefringent films and optical bodies can be radiatively treated in a chosen spectral range that is outside the spectral band normally transformed by the optical body for a chosen application of interest. The radiative treatment may be achieved by any variety of means which can focus light of the selected spectral band at a sufficient intensity on a chosen location of the film. A particularly suitable means for the radiative treatment is a pulsed laser. This may be an amplified pulsed laser. In some circumstances, the laser may be tunable. For example, an optical film operationally reflective in the visible band may have an absorber in the near IR, or the near UV if the polymer is not particularly absorptive there. For a multilayer optical film, the selection of the absorption band for treatment may be chosen with regard to the optical band of the film. Preferably, the film should not reflect the directed radiant energy for the angle of incidence chosen for this directed radiant energy, although treatment may still be possible if the reflection is sufficiently low. Radiant energy from lasers is frequently substantially polarized. It can be useful to orient the impinging beam at an angle coincident with the Brewster's angle at the outer surface to minimize energy loss. Because the MOF reflection band also shifts to shorter wavelengths with higher incident angles, shorter absorption wavelengths can be used than would be expected solely by the band placement at the normal incident angle.

For example, an MOF mirror film with a biaxially oriented skin layer of index 1.75 (at a wavelength of 632 nm) and corresponding Brewster's angle of about 60 degrees and a sharp normal incident right band edge at about 800 nm can accept a directed light beam above about 700 nm at the Brewster's angle, allowing for processing using this wavelength even though it is reflected at normal incidence. The right band edge is chosen in part to ensure reflection at all angles of interest. At 880 nm, the reflection band still covers to about 700 nm at grazing incidence. At this band position, the band covers up to 750 nm near the Brewster's angle of this case. Some headroom may be desirable between the band edge and the wavelength of the directed radiation. If it is desired that the beam be directed through any of the potential layers, then this puts a practical lower limit in this case of about 750 to 800 nm (vacuum) for the directed energy above the optical band. Alternatively, one may choose to direct the radiant energy through a preferred side of the film so that the intervening wavelength bands in the film do not block the particular energy of interest. For example, a green laser at 532 nm may be used to process a blue packet as long as it does not need to pass at normal incidence through a green reflecting packet, or if the beam could pass through it at sufficiently oblique angle to no longer be reflected by that packet due to the band shift.

If near UV radiation is used for patterning (which again depends on the material absorption characteristics), the band shifting of packets with a longer wavelength reflection band may obstruct the beam. Normally incident directed radiation can then have the highest wavelength relative to the fixed left band edge of the film, whereas oblique angle processing could be obstructed by band shifting. Left band edge shifting is also relevant for other visible or IR beams used with constructions that have band shifting reflection bands higher than the beam vacuum wavelength.

Management of the absorbed radiant energy through the thickness of the film and the resulting thermal pulse through the thickness, is one aspect of the present disclosure. Controlled melting resulting in reduced or eliminated birefringence of materials in the selective layers spanning a selected portion of the film thickness calls for a reasonably low level of absorption of the directed radiation to ensure uniform effect. The materials in the selected layers(s) should not over-heat either from a time pulse or thermal standpoint resulting in either excessive ionization or thermal decomposition. For example, if one considers a purely heat capacity driven situation, a material brought from 25 degrees C. to a desired 300 degrees C. heats up 275 degrees C. If the selected layer absorbs 10% of the directed radiation, then the front portion closest to the source of the directed radiation needs to heat up to about 330 degrees C. in order for the back portion to heat up to the desired 300 degrees C. Sufficient headroom between the hottest portion of the film and deleterious temperatures or ionizing conditions should be maintained. Through-thickness temperature control may be important to selectively remove birefringence from only one material, e.g., to prevent overheating. In some cases, preheating may be desired. Efficiency of the process, from a laser energy perspective, can be increased by preheating the film before and during laser exposure. The preheat temperature of the film should be above room temperature but below the melting temperature for the polymers used in the optical packet. Typically, when the film is pre-heated throughout its thickness, then a larger amount of the directed radiation may be absorbed for the same level of thermal headroom. For example, when a back portion of a selected film region at 200 degrees C. is heated to 300 degrees C. for a difference of 100 degrees C., the front portion will only be overheated to 310 degrees C. when about 10% of the incident energy of the beam is absorbed. In this case, the selected region could absorb up to about 23% of the directed radiation, to again result in heating up to about 330 degrees C. with a temperature rise of 130 degrees C. for the front portion and a 100 degree C. rise for the back portion to again reach the desired 300 degrees C. The amount of preheating may need to be controlled to prevent wash-out of the thermal pulse during cooling resulting in significant melting beyond the selected region. Generally, the higher the pre-heating, the closer the remainder of the film thickness is to melting. These non-selected portions can become liable to melting as the thermal pulse spreads. The maximum temperatures induced by the directed radiation, the sidedness of the film construction with its various layer thicknesses, the pre-heating gradient through the film, and the path of the directed radiation, all may need to be considered together to optimize the film and process. In fact, the thermal management is even more complicated, because sufficient energy is preferably absorbed not only to raise the material into its melting range but also to actually cause the melting. The management of the energy pulse(s) of the directed radiation should include the time factor to ensure that melting can in fact occur and that the thermal wave is adequately contained along the thickness- or z-axis to prevent undesired melting, such as to melt birefringent layers in one microlayer packet without melting birefringent layers in another microlayer packet. In particular, the sequence and duration of the pulses may need to be carefully controlled.

The power, scan speed, and beam shape of a laser source (if a laser source is used for the selective heating) and the dye loading (or loading of another absorbing agent, if in fact any absorbing agent is used) combine to provide an effective energy transmitted to the processed region of the film under adiabatic conditions. Although thermal conditions are not generally adiabatic in practice, approximate laser processing conditions can be estimated by determining the required energy for conversion assuming adiabatic conditions with a specification of the film construction, background temperature, and knowledge of the various heat capacities, heats of fusion, and melting points of the pertinent materials. Dispersion of the IR absorber or other absorbing agent may be an important consideration, including dye solubility limits and dissolution mechanics. For undissolved dyes and pigments, particle size and shape distributions may be important. For example, excessively large absorbing particles can over-heat relative to their surrounding film matrix, causing film defects such as degradation, wrinkling, blistering, layer delamination, or other damage. Film cleanliness may also be important, since surface and embedded dust and similar particulate matter may also cause random or unanticipated defects. Other considerations include the beam shape and frequency (if a pulsed source is used) of the laser source, the scanning pattern, the mounting of the film (e.g. onto a card or other substrate by lamination such as with an adhesive or by other means), and the heat transfer, e.g. as controlled by the various thermal conductivities within and heat transfer coefficients from the film.

Management of the absorbed radiant energy across the film plane may also be important to ensure the desired spatial feature. Beam size and focus can also be important process controls. In some cases, it may be desirable to place the film at a location where the beam is focused to its smallest size, while in other cases the film may be deliberately placed at a location where the beam is defocused by a desired amount. The manner of scanning the film and how quickly the directed light beam path can overlap or turn on itself during processing of an area can alter surface roughness, smoothness, haze, wrinkling and other phenomena. With regard to the film pre-heating discussion above, the beam may be controlled in such a way that a portion of the film currently being irradiated is close to a portion of the film that was recently irradiated, so that the heat provided by the laser itself can be considered to preheat the portion of the film currently being irradiated. This may occur, for example, where the beam is scanned along a first path, and soon thereafter (while the portion of the film along and close to the first path is still at an elevated temperature) scanned along a second path that is adjacent to, or even somewhat overlapping with, the first path.

Time-related aspects such as the duration of the directed radiation may also be important. We have found that relatively short, pulsed operation is often advantageous. For example, in some typical cases we have found that the heating time, as determined by the duration of the laser exposure, is preferably in the range of 10 nanoseconds to 10 milliseconds. The upper exposure duration is a function of the amount of thermal diffusion into other portions of the film through the thickness that can be tolerated for the given application. The shorter the duration, the more compact the delivery of the energy into the desired film region of interest; for example, it may be possible to establish a momentary heat pulse mostly contained within the desired packet. The details of the thermal diffusion are a function of the materials, the anisotropic thermal conductivities at the particular material orientation conditions, the densities, the heat capacities, the thickness of the regions of interest, the beam durations, and the like. In exemplary embodiments, the energy absorbed by the optical packet is of sufficient intensity and duration to melt the optical repeat units in the optical packet but of insufficient intensity and duration to evaporate, significantly chemically modify, or ablate components of the film.

In order for the laser exposure to modify the packet birefringence in the second zone, both high intensity (high power/unit area) and high energy density are desirable, but not necessary. These characteristics help to ensure that a substantial amount of heat generated by absorption of the directed radiation by the materials in the packet stays in the packet, by reducing the time needed for treatment. Thermal diffusion reduces the concentration of energy in the packet and therefore may reduce the efficiency of the process. In this regard, it is often desirable for only a small amount of heat to be dissipated outside of the packet, either laterally into the first (untreated) zone or within the (treated) second zone to other layers of the film. The more heat dissipated outside of the absorbing packet or packets in the second zone, the less efficient the process in those cases where it is desired to heat only a portion of the thickness of the film in the second zone.

The manner of cooling may also need to be carefully considered. Rapid cooling may be useful in some instances. Cooling from one or both sides of the film may be desirable.

Reasonably low levels of absorption of the directed radiation may also be important for end-use applications. It is desirable that environmental exposure not unduly overheat the film. In particular, near IR absorption may result in film heating when exposed to direct sunlight. Preferably, the expected flux does not raise the film temperature unduly. For example, it may be desirable to maintain the temperature of the system below the glass transition temperature of the film under normal use. The amount of energy absorption is in part related to the amount of energy that must be captured from the pulses to achieve the needed temperature difference from the given level of pre-heat.

The desired absorption in the system may thus be optimized, balancing the flux levels, thermal diffusion (wash-out), preheating, and cooling to achieve the desired uniformity and extent of treatment while minimizing end-use concerns, such as color, grayness, or environmental radiant absorption.

It may be useful to incorporate energy absorbing buffer layers or regions between the functional layers or regions of the film. These buffer regions can heat up and even partially or totally melt while protecting another functional region of the film from heating via thermal diffusion (wash-out). In one example, this buffer region could be layers (e.g. PBLs) between packets of a similar or different material than that used in the optical layers. In another example, a lower melting temperature material can be used as "thermal speed bump" between functional layers of higher melting temperature materials. In a multilayer optical film, one simple example is a PEN:PMMA or PEN:isotropic coPEN mirror construction comprising optical packets separated by a lower melting and oriented coPEN protective boundary layer (PBL) such as a so-called low-melt PEN (LmPEN) which e.g. may comprise 90%/10% naphthalate/terephthalate carboxalate subunits.

The melting point and/or softening point (e.g., the glass transition temperature) of a material layer in a polymer film can be measured and analyzed using differential scanning calorimeter (DSC) techniques. In such techniques, the film sample may first be suitably dried, e.g. under vacuum of less than 200 mTorr for about 48 hours at 60 degrees C. before testing. A sample of about 5 mg may then be weighed and sealed in a hermetically sealed aluminum Tzero pan. A heating-cooling-heating ramp may then be conducted over a suitable temperature range, e.g., 30-290 degrees C. A constant heating rate of 20 degrees C./min, or other suitable heating rate, can be used for the ramp. After the scan, the first heating thermal trace may be analyzed for softening step changes and melting peaks. The analysis may reveal both the melting temperature and the characteristic bandwidth associated with the melting temperature, the bandwidth referred to as the peak width at half height (PWHH). Finite values of PWHH reflect the fact that a material can melt over a finite range of the temperatures rather than at a single precise temperature. The PWHH may become important for articles whose different materials have (peak) melting temperatures that are close to each other. The DSC technique was used to measure the melting temperature and PWHH for three exemplary materials suitable for use in multilayer optical films: polyethylene naphthalate (PEN); a naphthalate-based copolymer of PEN, described in Example 7, so-called PEN-CHDM10 of U.S. Patent Application Publication US 2009/0273836 (Yust et al.), referred to herein as "PEN-Gb"; and a PEN-based polymer in which 20% of the dimethyl 2,6-naphthalene dicarboxylate (NDC) is substituted with 4,4'Biphenyldicarboxylic acid dimethyl ester, referred to herein as "PENBB20". Samples of these materials were measured, and exhibited melting points of 261, 248, and 239 degrees C. for the PEN, PEN-Gb, and PENBB20 samples respectively. The PWHH of the samples were also measured. The PWHH of the PEN sample was 7 degrees C., but depending on processing conditions of the polymer this may range from 5 to 10 degrees C. The PWHH of the PEN-Gb sample was 6 degrees C., but depending on processing conditions this may range from 5 to 15 degrees C. The PWHH of the PENBB20 sample was 10.4 degrees C., but depending on processing conditions this may range from 5 to 15 degrees C. In general, the PWHH of a polymer film may be decreased by heat setting the film at a suitable temperature below the melting point for a suitable time. In general, for any particular wavelength band for the directed radiation, the absorptive power of the remainder of the film along the thickness direction may be tailored to be sufficiently low, relative to the selected portion of the film for this radiation, to prevent undesired over-heating and undesired alteration of these non-selected portions. The film extrusion process may be designed to ensure that migration of the actively absorbing material of a selected portion of the film from that portion to another functional portion of the film does not happen to a significant degree. Again, a buffer layer that blocks such migration, e.g. through chemical nonaffinity, can be used. Processing methods, including residence times for layer contact and the like, can also be used.

The directed radiant treatment may be achieved directly after or even during film manufacture, separately but still in roll form, after sheeting, or after mounting to another substrate such as a glass plate, or plastic or paper cardstock. The level of precision should be balanced against the process variations. For example, web flutter should be sufficiently handled for a roll process. The directed radiant treatment could be achieved as the film moves over a roller while the film is under tension, perhaps between nips. A protective film can be placed between the film and the rollers to continuously clean the rollers and otherwise prevent cosmetic defects such as scratches. In another example, the film can be mounted on a fixed substrate after sheeting, or mounted or fixed over a temporary backing in a semibatch manner. For example, portions of the film roll can successively contact a protective film and slide over a plate. The film roll conveyance could stop, the designated portion over the plate could be slightly tensioned as desired, and then the directed radiant treatment applied over the designated portion backed by the plate. The finished roll portion may then be moved off the plate treatment zone by a successive conveyance by which the successive portion of the roll may be treated, and so on until the entire roll is treated.

The interior patterning method described herein may also be combined with known techniques, e.g. ablative, surface amorphization techniques, focusing methods, embossing, thermoforming, etc.

A variety of melt-extrudable absorbing additives are available from a variety of sources. The additives may be organic, inorganic, or a hybrid. They may be dyes, pigments, nanoparticles, or the like. Some potential IR dyes include any of the Nickel, Palladium, and Platinum-based dyes available from Epolin, Inc. under the tradename Epolight™. Other suitable candidates include Amaplast™-brand dyes, available from ColorChem International Corp., Atlanta, Ga. Both linear and non-linear absorbing additives may be considered.

Several factors in combination may make a dye particularly suitable for the present application. Thermal stability through the extrusion process is particularly desirable. In general, the extrusion process is desirably hot enough to both melt and allow the conveyance of the melt streams at suitably manageable pressure drops. For example, polyester based systems may require very high stability up to about 280 degrees C. These requirements can be reduced by using co-polymers of various polymers, such as coPENs, e.g. with processing around 250 degrees C. Olefinic systems like polypropylene, and polystyrene, are typically less demanding. The choice of resins in a particular multilayer optical film construction can narrow the choices of potential absorbing material candidates, as can dye migration tendencies, the ability to be uniformly dispersed in the desired materials layers, the chemical affinities of the dye to the various materials, and so forth.

EXAMPLES

Cast Webs 1 and 2

The term "cast web" refers to a cast and formed multilayer body prior to subsequent drawing and orientation but after the initial casting process. First and second multilayer polymer webs, or cast webs, were constructed using polyethylene naphthalate (PEN), and a naphthalate-based co-polymer. The naphthalate-based copolymer is referred to as PEN-Gb. It is described in Example 7, so-called PEN-CHDM10, of U.S. Patent Application Publication US 2009/0273836 (Yust et al.). PEN-Gb is thus a co-polymer made with initial monomer charges in the proportion of 38.9 lbs NDC (dimethyl 2,6-naphthalene dicarboxylic acid—e.g. as available from BP Amoco, Naperville, Ill.) to 20.8 lbs of EG (ethylene glycol—e.g. as available from ME Global, Midland, Mich.) and 2.23 lbs of CHDM (cyclohexane dimethanol—e.g. as available from Eastman Chemical, Kingsport, Tenn.), according to Table 1 of the referenced U.S. patent application.

The multilayer polymer web was formed using a coextrusion process as generally described in U.S. Pat. No. 6,830,713 (Hebrink et al). The various polymers were generally dried, e.g. at 85 degrees C. for 60 hours, and then fed into separate extruders of either a single screw or twin screw configuration. The first and second polymers forming the optical layers were co-extruded, each with its own extruder with a final extruder zone temperature, and fed through a melt train including a 151 alternating layer feedblock using a gradient feed plate that provides a layer thickness gradient through the film thickness. These layers form the so-called optical stack or microlayer packet of the finished multilayer film. To improve flow quality of the layers, two thicker, so-called protective boundary layers (PBLs) adjoin the outermost layers of the optical stack and protect the optical stack from the highest shear rates at the feedblock walls. The PBLs are also fed by one of the extruders. For purposes of these examples, the material feeding the PBLs will be referred to as material 1, the other as material 2, and likewise for the extruders. Each PBL is about 4% of the thickness of the optical stack. Prior to spreading in the die at a die set point temperature, an additional skin layer fed by extruder 3, with a material 3, is joined to the coextruding multilayer flow, top and bottom, for additional layer stability during flow in the die. In these described examples, material 3 may be the same as material 1 or 2. (The terminology "material 1", "material 2", and "material 3" used in connection with the examples should not be construed in any predetermined fashion with respect to the "first material" and "second material" terminology used elsewhere in this document, e.g. in connection with FIGS. 5A-N. For example, the "material 1" of the present examples may correspond to the "first material" of FIGS. 5A-N, or alternatively the "material 2" of the present examples may correspond to such "first material".) In the case of the first and second cast multilayer webs (Cast Web 1 and Cast Web 2), material 1 was the PEN, material 2 was the PEN-Gb, and material 3 was again PEN. The multilayer construction was cast from a die, quenched and electro-statically pinned to a casting wheel to form rolls of the first cast multilayer optical web. This first cast web was wound upon disposable cores having widths of at least 10 cm with a desired approximate thickness (or caliper) over a central portion in width dimension. Other details of construction of the Cast Web 1 and Cast Web 2 are provided in Table A below.

In connection with these cast webs, masterbatches were made prior to the multi-layer co-extrusion by feeding the dye and polymer resin in prescribed weight ratios into a twin screw extruder with or without an additional vacuum applied as needed to ensure minimal degradation of the resin. The extrudate was then chopped into pellets for feeding. The dye used in these example cast webs 1 and 2 was a platinum-based dye, Epolite™ 4121 available from Epolin, Inc., Newark, N.J. The peak absorption wavelength for this dye is around 800 nm. For the masterbatch compounding with the Epolite™ 4121 dye, nominal final zone extrusion temperatures were between 240 degrees C. and 260 degrees C. A typical masterbatch nominal dye concentration was 1.0 wt % dye in polymer.

TABLE A

Processing Conditions for Cast Web 1 and Cast Web 2

| Conditions | Cast Web 1 | Cast Web 2 |
| --- | --- | --- |
| Material 1 | PEN | PEN |
| Material 2 | PEN-Gb | PEN-Gb |
| Material 3 | PEN | PEN |
| Extruder 1 Final Temperature | 282 degrees C. | 282 degrees C. |
| Extruder 2 Final Temperature | 260 degrees C. | 260 degrees C. |
| Extruder 3 Final Temperature | 282 degrees C. | 282 degrees C. |
| Melt Train Temperature | 285 degrees C. | 285 degrees C. |
| Die Temperature | 279 degrees C. | 279 degrees C. |
| Material 1 relative weight fed | 8 | 8 |
| Material 2 relative weight fed | 7 | 7 |
| Material 3 relative weight fed | 12 | 12 |
| Stream fed Masterbatch | Material 2 | Material 2 |
| weight % dye in Master batch | 1 | 1 |
| Masterbatch fraction of stream | 0.11 | 0.11 |
| Cast thickness, center (microns) | 370 | 270 |

Cast Webs 1 and 2 thus each comprised 151 layers that later became microlayers in the finished films, and utilized alternating material layers of PEN and PEN-Gb, and incorporated the IR absorbing dye (Epolite™ 4121) in the PEN-Gb layers. The refractive indices of unoriented (isotropic) PEN and PEN-Gb at a wavelength of 632.8 nm are 1.643 and 1.638, respectively. The chief difference between Cast Webs 1 and 2 was their thicknesses, which was controlled by the speed of the casting wheel.

Birefringent Multilayer Films Made Using Cast Webs 1 and 2

The multilayer cast webs were then drawn or stretched so as to form doubly birefringent multilayer optical films. A laboratory stretcher such as the KARO IV (available from Brueckner) was used for the present examples. The cast webs were generally pre-heated (with a pre-heat time and temperature) and then stretched at a uniform separation speed of the grippers corresponding to an initial strain rate (given by a % strain rate) to nominal draw ratios (the ratio of initial to final gripper separation) in two orthogonal in-plane directions referred to as x- and y-directions. The processing conditions used for stretching the Cast Webs 1 and 2 were selected such that, in the resulting multilayer optical films (referred to below as Multilayer Optical Films 1 through 5), the PEN microlayers as well as the PEN-Gb microlayers were positively birefringent.

The final films could then be analyzed, before and/or after radiant energy processing, using a variety of physical and optical methods. The refractive indices of the outer skin layer (composed of the oriented PEN material), where indicated, were measured at 632.8 nm using a Prism Coupler available from Metricon (Piscataway, N.J.). The transmission band characteristics of the various cast webs and oriented multilayer optical films were measured with a Perkin-Elmer Lambda 950 spectrophotometer. Visual (e.g. color) characteristics of the films were also observed and noted.

The processing conditions and measured or observed characteristics of Multilayer Optical Films 1-5 are provided in Table B.

PEN-Gb microlayers and the PEN microlayers must be very small, hence the PEN-Gb microlayers must have a birefringence very close to the PEN microlayers).

Figure 10:
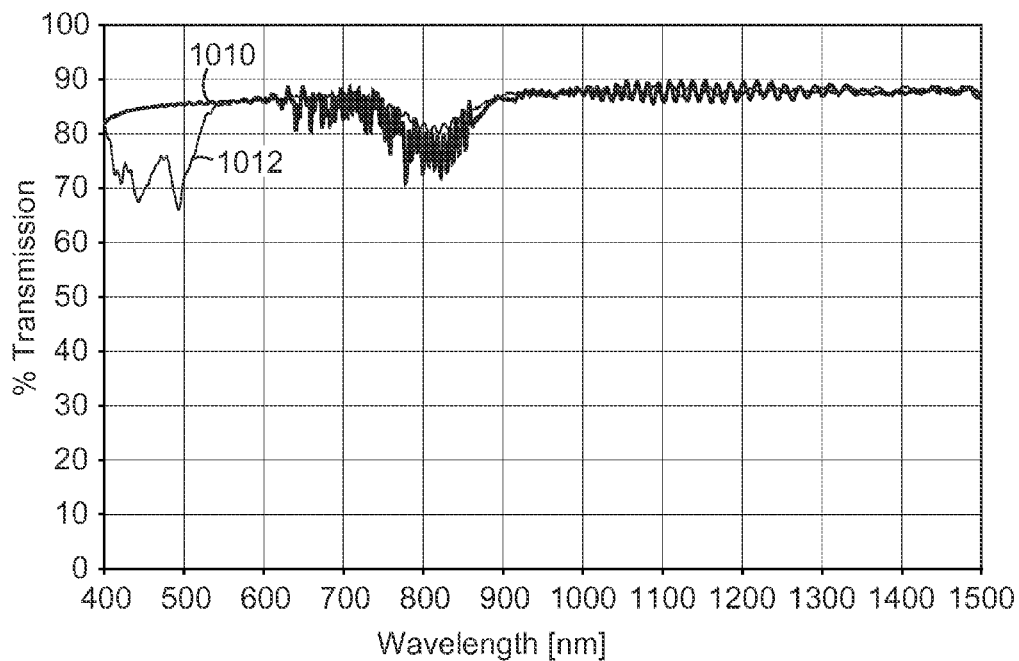
FIG. 10 is a graph of the measured spectral transmission of two doubly birefringent multilayer optical films that were fabricated.

Comparison between Films 1 and 2 allows one to evaluate the effect of the pre-heat and draw temperature process conditions, which was the principal process difference between these two films. Both of these films were drawn in the batch stretcher in a simultaneous drawing mode. Variance in the batch stretcher resulted in a slightly greater stretch in the x-direction versus the y-direction, although each of Films 1 and 2 had the same nominal stretch ratio. The product of the x- and y-draw ratios (referred to as the "biaxial ratio") was very close to the nominal biaxial ratio in Film 2, and about 8% less in Film 1 in the central portion of the film where subsequent measurements were taken. FIG. 10 portrays the measured normal incidence transmission spectra of Film 1 (curve 1010) and Film 2 (curve 1012) in unpolarized light.

As is evident from the spectra of FIG. 10, the lower temperature stretching (used to fabricate Multilayer Optical Film 1) results in a nearly flat and high transmission curve, which is characteristic of a clear film. The higher temperature stretch (used to fabricate Multilayer Optical Film 2) provides a small but measurable difference in refractive index between the two materials, which is manifested as a weak reflection in a band extending from about 400-535 nm in curve 1012. The small refractive index difference, and the associated weak reflection, could be considered as partially exposing or revealing in Film 2 the otherwise dormant microlayer structure (or the dormant or underlying reflection potential) that exists in Film 1, and Film 2. Because the deviation is small, the corresponding reflectivity is likewise small, and neither of the films appeared particularly colored. Rather, only a slight irridescence was observed in Film 2, while Film 1 was substantially clear. A weak absorption from the IR dye (Epolite™ 4121) is evident in both spectra near 800 nm, as expected. This absorption was made use of in subsequent laser-based heat treatment of selected zones of the film to relax the birefringence of some of the microlayers and change the reflectance characteristic,

TABLE B

Multilayer Optical Films 1 through 5

| Conditions | Film 1 | Film 2 | Film 3 | Film 4 | Film 5 |
| --- | --- | --- | --- | --- | --- |
| Cast Web | 2 | 2 | 1 | 1 | 1 |
| Preheat time (seconds) | 60 | 60 | 60 | 60 | 60 |
| Pre-heat temperature (degrees C.) | 125 | 145 | 125 | 140 | 125 |
| Draw temperature (degrees C.) | 125 | 145 | 125 | 140 | 125 |
| Initial strain rate along x per second | 10% | 10% | 10% | 10% | 10% |
| Initial strain rate along y per second | 10% | 10% | 10% | 10% | 10% |
| Final Nominal x Draw Ratio | 4.25 | 4.25 | 4.25 | 4.25 | 4.25 |
| Final Nominal y Draw Ratio | 4.25 | 4.25 | 4.25 | 4.25 | 4.25 |
| Heat set time (seconds) | 0 | 0 | 0 | 0 | 0 |
| Visible Appearance of transmitted light | clear | irridescent | clear | irridescent | clear |
| Film thickness (microns) | 16.3 | 15 | 21.6 | 20.3 | |
| Refractive index (nx) of PEN skin layer @ 632.8 nm | 1.738 | 1.737 | 1.732 | 1.736 | |
| Refractive index (ny) of PEN skin layer @ 632.8 nm | 1.725 | 1.714 | 1.730 | 1.708 | |
| Refractive index (nz) of PEN skin layer @ 632.8 nm | 1.509 | 1.530 | 1.508 | 1.517 | |

For these films, the refractive indices of the interior PEN microlayers are substantially the same as the measured refractive indices of the outer PEN skin layers. The refractive indices of the interior PEN-Gb microlayers are also known to be birefringent based on the observed characteristics of the films (e.g., in order for Multilayer Optical Film 1 to have a clear appearance, the refractive index differences between the as described further below. Subsequent heat treatment of the film to induce melting of the selected layers, e.g. via laser processing, resulted in a much deeper transmission well (stronger reflection band) with strong color, as described below.

Like Cast Web 1, Cast Web 2 was also drawn in the batch stretcher at lower and higher temperatures, in a simultaneous drawing mode, and this formed drawn Multilayer Optical Films 3 and 4, respectively. Another drawn film, referred to as Multilayer Optical Film 5, was made from Cast Web 2 as a substantial replica of Film 3. Variance in the batch stretcher again resulted in a slightly higher stretch in the x-direction compared to the y-direction, although each of the drawn films had the same nominal stretch ratio. The biaxial ratio was again very close to the nominal biaxial ratio in Film 4, and about 7% less in Films 3 and 5 in the central portion of these films, where subsequent measurements were taken.

As seen in Table B above, none of Films 3, 4, or 5 appeared particularly colored. Films 3 and 5 had a very clear appearance. In Film 4, only a slight iridescence was observed. Consistent with the results of Films 1 and 2, the higher temperature stretch (used to fabricate Multilayer Optical Film 4) provided a small but measurable difference in refractive index between the PEN and PEN-Gb material layers, which was manifested as a weak reflection at red wavelengths. In this regard, the thicknesses of the microlayers in Films 1 and 2 corresponded to reflectivity in the blue portion of the visible spectrum (even if, as in Film 1, no such blue light reflectivity occurred due to substantial layer-to-layer refractive index matches), while the thicknesses of the microlayers in Films 3-5 corresponded to reflectivity in the red portion of the visible spectrum (even if, as in Films 3 and 5, no such red light reflectivity occurred due to substantial layer-to-layer refractive index matches).

Multilayer Films with Internal Patterning

Patterned Film 1

Multilayer Optical Film 5 was laminated onto a white PETG plastic card using a clear pressure sensitive adhesive, with the thinner microlayers closest to the card, and then treated with a Coherent Micra ultrafast oscillator laser (wavelength=800 nm, pulse rate=70 MHz) using a variety of scanning speeds. (In this regard, the "thinner" microlayers is in reference to the thickness gradient built into the 151 layer stack of each of Films 1 through 5. On one side of the microlayer stack, the microlayers (and the optical repeat units) are thicker than average, and on the other side of the stack the microlayers or optical repeat units are thinner than average. The ratio of the thickest (optical) microlayers to the thinnest microlayers was designed to be nominally about 1.2.) An average laser power of 880 mW was used with a beam diameter of approximately 5 microns. A square-shaped zone, approximately 1.5 cm², was fully treated with overlapping sweeps or scans of the laser beam. Under some laser operating conditions, the treated zone was made to strongly reflect red light. The surface of the film remained smooth, and no discernable variation could be felt by sliding a finger across the outer surface from the untreated area to the treated area.

At a laser scan speed of 55 mm/sec, the film appeared slightly hazy with no discernable color. At a laser scan speed of 60 mm/sec, only a faint color was observed at normal incidence, indicative of only a small change in reflective characteristic relative to that of the untreated portion of the film. At a scan speed of 70 mm/sec, the strongest cyan color for transmitted normally incident light, and the strongest red color for reflected normally incident light, was observed, indicative of a much larger change in the reflective characteristic. At a moderate oblique viewing angle (e.g., 45 degrees from normal incidence), the strong colors for the treated zone at 70 mm/sec shifted to a purple color for transmitted light, and a yellow color for reflected light. At scan speeds higher than about 70 mm/sec, the observed reflected and transmitted colors faded again, although a more prominent cyan color from transmitted light could be observed at an oblique viewing angle (e.g. 60 degrees from normal incidence) at scanning rates between 75 and 85 mm/sec. Viewing the variously treated zones at the various scan rates, the color shifted from cyan to purple at progressively higher oblique angles of incidence with increasing scan speeds of the treated zones.

Without wishing to be bound by theory, one interpretation of the behavior of the treated, patterned portions of Patterned Film 1 (made from Multilayer Optical Film 5) can be further understood with reference to FIG. 10. Differential scanning calorimetry on the initial resins suggested that the PEN and PEN-Gb materials used in these multilayer films had melting points of about 261 degrees C. and 248 degrees C., respectively. As typical with polymeric materials, these melting points are indicative of a peak value within a range (e.g., a range of about 10 to 20 degrees C.). Thus, these materials had roughly a 13 degree C. melting point difference. To process at least some of PEN-Gb material, which we refer to here generically as material 2, without processing all of the PEN material, which we refer to here generically as material 1, the temperature should be raised to at least the lowest temperature of the melting point range of material 2 and not higher than the highest temperature of the melting point range of material 1. In this case, material 2 has a wider melting range of about 20 degrees C. since it is a copolymer. We may thus expect that the window for laser processing (selective heat treatment) of these films may be as narrow as about a 5% power or speed range for a 13 degree C. temperature difference, or as wide as about 15% power or speed range for a 30 degree C. temperature difference using an adiabatic argument. In practice, the thermal diffusion increases the range of scan speeds between the thresholds of first melting and total overheating to over 40%. From the absorption feature seen at about 800 nm in FIG. 10, it is evident that about 10% of the radiant energy of the laser is absorbed. This suggests that a scenario exists in which only a portion of the through thickness of the total optical packet (i.e., only a portion of the 151 microlayers in the microlayer stack) can be processed to a point where that material 2 microlayers are essentially melted (i.e., the birefringence relaxed to an isotropic state) while the material 1 microlayers are essentially unmelted (i.e., the birefringence substantially maintained).

The Multilayer Optical Film 2, made from the thinner Cast Web 2, has an effective reflection band between 400 nm and 535 nm as evident from the drop in transmission ("transmission well") present in curve 1012 in FIG. 10. From a simple thickness argument based on the greater thickness of Cast Web 1 relative to Cast Web 2, Multilayer Optical Film 5 would be expected to have a reflection band between 600 nm and 800 nm (i.e a factor of 1.5× higher.) Calculating a layer thickness profile from the spectral shape of curve 1012 in FIG. 10, the physical center of the optical packet is found to be about 700 nm. When thermal diffusion is important, such as at these lower scanning speeds, the threshold rate for treatment is expected to only melt the very middle of the packet. The middle of the packet is in the outer range of visible red; and, thus for the scan speed of 85 mm/sec, only an extremely weak normal angle red reflection is observed. Observing the treated area obliquely provides the stronger cyan color, for transmitted light, as the reflection band shifts to shorter, more perceptible, red wavelengths at high angles of incidence. Under this theory, no purple color is observed at these moderate observation angles because the thinner layers, reflective between 600 and 700 nm at normal incidence, are insufficiently processed, i.e., their birefringence has not relaxed sufficiently to provide the layer-to-layer refractive index difference needed for substantial reflection. As the scanning speed decreases, more of the packet is melted, and the left band edge for normally incident light progresses deeper into the visible red towards the 600 nm band edge. At the slower speed of 70 mm/sec, the thinner layers are well processed: a strong cyan color is observed for normally transmitted light. Likewise, the band shift of these thinner layers is evidenced with the purple color at high viewing angle. At still slower speeds, some of the central micro-layers of the optical packet are overheated, and so the lose their reflective power. Thus the weaker cyan color at normal incidence at 65 and 60 mm/sec. Finally, at the slowest speed of 55 mm/sec, a matte finish appears in the processed area, perhaps due to overheating of the film with a haze formation due to quiescent, un-oriented re-crystallization after treatment. No color is observable. It is surmised that at this speed, both materials are thoroughly melted. Since both materials have similar indices of refraction in the unoriented state, no significant optical power results for the reflection band.

Cast Web 3

A third cast web, referred to as Cast Web 3, was made in similar fashion to Cast Webs 1 and 2, except that a copolymer referred to as PENBB20 was used in place of the copolymer PEN-Gb. PENBB20 is made with a 20 mol % carboxylate sub-unit substitution. In particular, 20% of the dimethyl 2,6-naphthalene dicarboxylate (NDC) is substituted with 4,4'Biphenyldicarboxylic acid dimethyl ester. For Cast Web 3, the material 1 was PEN, material 2 was the PENBB20, and material 3 was again PEN. Similar to the combination of PEN and PEN-Gb, these materials have well-matched indices in the isotropic, amorphous state. Other details of the cast web construction, which included 151 layers that later formed the microlayer stack in the stretched films, and which used the Epolite™ 4121 infrared absorbing dye in the masterbatch, is provided in Table C:

TABLE C

Processing Conditions for Cast Web 3

| Conditions | Cast Web 3 |
|---|---|
| Material 1 | PEN |
| Material 2 | PENBB20 |
| Material 3 | PEN |
| Extruder 1 Final Temperature | 282 degrees C. |
| Extruder 2 Final Temperature | 260 degrees C. |
| Extruder 3 Final Temperature | 282 degrees C. |
| Melt Train Temperature | 285 degrees C. |
| Die Temperature | 279 degrees C. |
| Material 1 relative weight fed | 9 |
| Material 2 relative weight fed | 7 |
| Material 3 relative weight fed | 15 |
| Stream fed Masterbatch | Material 2 |
| weight % dye in Master batch | 1 |
| Masterbatch fraction of stream | 0.11 |
| Cast thickness, center (microns) | 335 |

Birefringent Multilayer Film Made Using Cast Web 3

In a manner similar to how Cast Webs 1 and 2 were drawn to produce Multilayer Optical Films 1 through 5, Cast Web 3 was then drawn in the batch stretcher, in a simultaneous drawing mode, to form a drawn doubly birefringent multilayer optical film, referred to as Multilayer Optical Film 6. The processing conditions used for stretching the Cast Web 3 were selected such that, in the resulting Multilayer Optical Film 6, the PEN microlayers as well as the PENBB20 microlayers were positively birefringent. Variance in the batch stretcher resulted in a slightly higher stretch in the x-direction versus the y-direction, although each had the same nominal stretch ratio. The biaxial ratio indicated average actual draw ratios of about 4.25, slightly higher than the nominal values. Further stretching details are provided in Table D:

TABLE D

Multilayer Optical Film 6

| Conditions | Film 6 |
|---|---|
| Cast Web | 3 |
| Preheat time (seconds) | 60 |
| Pre-heat temperature (degrees C.) | 140 |
| Draw temperature (degrees C.) | 140 |
| Initial strain rate along x per second | 100% |
| Initial strain rate along y per second | 100% |
| Final Nominal x Draw Ratio | 4 |
| Final Nominal y Draw Ratio | 4 |
| Heat set time (seconds) | 0 |
| Visible Appearance of transmitted light | Clear |
| Film thickness (microns) | 18.5 |
| Refractive index (nx) of PEN skin layer @ 632.8 nm | 1.7168 |
| Refractive index (ny) of PEN skin layer @ 632.8 nm | 1.7587 |
| Refractive index (nz) of PEN skin layer @ 632.8 nm | 1.4988 |

This Film 6 had a relatively clear, uncolored appearance when viewed in transmission with normally incident light, with no noticeable reflectivity.

Multilayer Film with Internal Patterning

Patterned Films 2 and 3

Film 6 was incorporated as 1-inch circular patches in a laminate construction. The film was sandwiched between two pieces of clear Makrolon™ polycarbonate films (available from Bayer in the US, Pittsburgh, Pa.) and furthermore laminated to a white Makrolon™ backing. In this construction, the Film 6 was treated in selected areas or zones thereof with a Coherent Micra ultrafast oscillator laser (wavelength=800 nm, pulse rate=70 MHz). The resulting patterned film is referred to herein as Patterned Film 2. An average laser power of 915 mW was used with a beam diameter of approximately 58 microns. Scanning speeds of 145, 150, 155 and 160 mm/sec were used to form an array of parallel lines spaced 31 microns apart, center-to-center. The surface of the film remained smooth, and no discernable variation could be felt by sliding a finger along the outer surface of the film from untreated areas to treated areas. The treated portion of the film was a green reflector that appeared magenta under conditions favoring the viewing of transmitted light from the white backing.

The treated portions of Patterned Film 2 were further analyzed with visual microscopy. Under reflected light, a distinct array of green stripes spaced 31 microns apart, center-to-center, was clearly seen. At higher scan speeds, the stripes were thinner than they were at slower scan speeds as further detailed in Table E:

TABLE E

Effect of Scan Speed

| Scan Speed (mm/sec) | 145 | 150 | 155 | 160 |
|---|---|---|---|---|
| Processed line width (microns) | 27.6 | 20.7 | 17.2 | 13.8 |
| Separation between lines (microns) | 3.4 | 10.3 | 13.8 | 17.2 |

In this table, the "separation between lines" refers to the apparent width of the unprocessed portion that lies between two linear-shaped treated zones. Thus, scan speed can be used to control the level of coverage, or the degree of "half-tone coloring".

Figure 11:
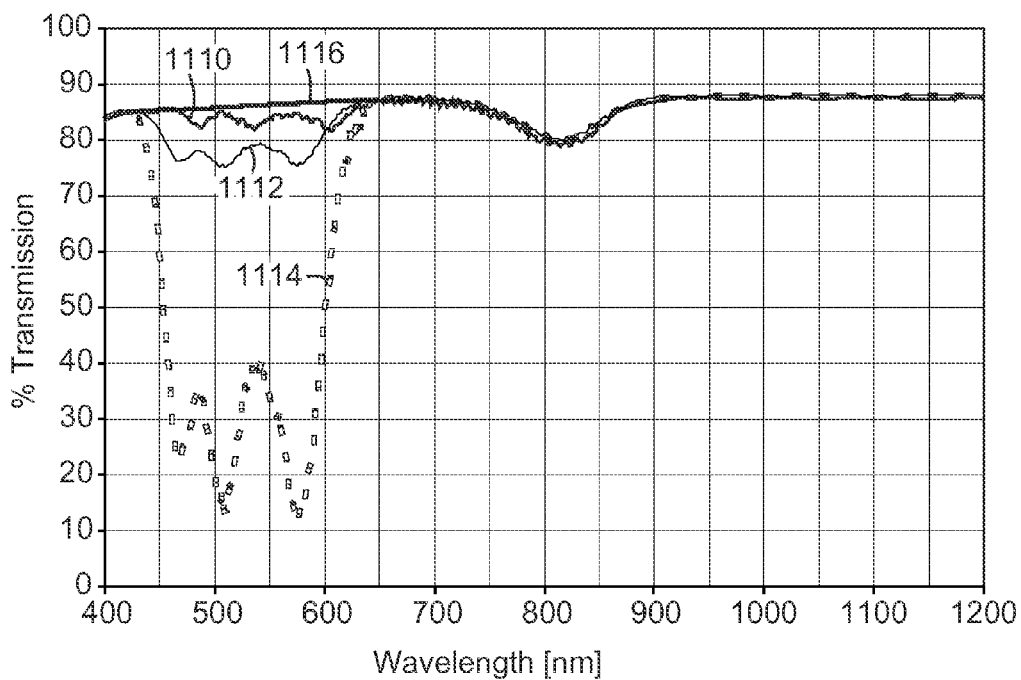
FIG. 11 is a graph of spectral transmission, on which is plotted measured data for an untreated and treated portion of an internally patterned doubly birefringent multilayer optical film, and on which is also plotted estimated data for the film.

In order to measure the transmission spectra of the treated zones, another piece of Film 6 was laser treated as a free-standing film, and the treated film is referred to herein as Patterned Film 3. FIG. 11 provides the measured transmission spectrum through the (unpatterned) Multilayer Optical Film 6 (curve 1110), and the measured transmission spectrum through a portion of the Patterned Film 3 (curve 1112) that included processed areas (parallel lines described above) and unprocessed areas (portions of the film between the parallel lines). Curve 1114 is an estimate of the transmission through a fully treated portion of the Film 6, i.e., curve 1114 attempts to correct curve 1112 for the presence of the unprocessed areas. Although the unprocessed areas of Patterned Film 3 are substantially clear upon visual inspection, the curve 1110 (which is representative of the unprocessed areas of Patterned Film 3) clearly shows a slight indication of a reflection band, evidenced by the drop in transmission between 460 nm and 640 nm. It is thus expected that the film will more strongly reflect green/yellow light (appear red/purple or magenta in transmission) upon treatment. The Patterned Film 2 was patterned at a variety of conditions and locations to cover approximately 15% of the area measured in the spectrum represented by curve 1112. The treated portions appeared magenta, red, or purple, depending on their location on the film, for normally incident light when viewed in transmission. Curve 1116 is an estimate of a baseline, i.e., what the reflectivity of Multilayer Optical Film 6 (and the unprocessed portions of Patterned Film 3) would be if stretching occurred under conditions that yielded zero refractive index mismatches between the PEN and PENBB20 microlayers. This curve 1116 is characterized by a transmission that increases linearly from 85.1% at 430 nm to 87.3% at 650 nm, the remainder being lost through Fresnel reflections at the front and back outer surfaces.

In contrast to Patterned Film 1 and Multilayer Optical Films 1-5, the resin combination used in Multilayer Optical Film 6 and Patterned Films 2 and 3 had more widely separated melting points. Differential scanning calorimetry on the initial resins suggest that the particular material 1 (PEN) and material 2 (PENBB20) had melting points of about 261 degrees C. and 239 degrees C., respectively, more than a 20 degree C. difference. Thus it was expected that the process window for laser treatment of these films would be wider than for the PEN/PEN-Gb films.

The clear appearance of Multilayer Optical Film 6 is indicative of a substantial match of refractive indices along all principal directions for the PEN/PENBB20 microlayer pairs. This was confirmed by fabricating a simple two-layer film having PEN as one (optically thick) layer and PENBB20 as the other (optically thick) layer. Such a film was made by providing a cast monolithic web (single layer) of PEN, and another cast monolithic web (single layer) of PENBB20. The isotropic refractive indices of these cast materials at 632.8 nm was 1.643 for PEN, and 1.639 for PENBB20. A sheet of the PEN web was placed against a sheet of the PENBB20 web, and the combination was drawn in the KARO IV batch orienter using 120 second preheat at 140 degrees C., and a nominal 3.75×3.75 (x/y direction) simultaneous stretch at 100%/sec initial strain rate followed by 30 second heat set at 180 degrees C. The two layers stuck together to form a drawn 2-layer film. The actual draw amount was determined to be 3.7 by 3.6 (x by y directions, respectively). The x, y, and z refractive indices of both the PEN material and the PENBB20 material could be directly measured, since optically thick layers of each material were accessible in the 2-layer drawn film. The measured indices were $nx=1.731$, $ny=1.767$, and $nz=1.489$ for the oriented PEN layer, and $nx=1.734$, $ny=1.780$, and $nz=1.498$ for the PENBB20 layer. These measurements confirmed the small refractive index differences between oriented layers of these materials, despite the fact that both materials were highly birefringent. In this case, the maximum out-of-plane index difference of the PEN layer was 0.278 (=1.767-1.489), the maximum out-of-plane index difference of the PENBB20 layer was 0.282 (=1.780-1.498), and the refractive index differences $\Delta nx$, $\Delta ny$, $\Delta nz$ were 0.003, 0.013, 0.009 respectively. Thus, the maximum difference in principal refractive indices between the materials at 632.8 nm was 20 times less than the maximum birefringence of the most birefringent material.

Cast Web 4

Another multilayer polymer web was formed in a manner similar to Cast Webs 1-3; however, a 275 alternating layer feedblock was used. Material 1 was the PEN, material 2 was the PENBB20 (used in Cast Web 3), and material 3 was again PEN. The multilayer construction was cast from a die, quenched and electro-statically pinned to a casting wheel to form the cast multilayer web referred to herein as Cast Web 4. Details of construction of the Cast Web 4 are provided in Table F below.

In connection with this cast web, masterbatches were made prior to the multi-layer co-extrusion by feeding the dye and polymer resin PENBB20 in prescribed weight ratios into a twin screw extruder with an additional vacuum applied as needed to ensure minimal degradation of the resin. The extrudate was then chopped into pellets for feeding. The dye used in this Cast Web 4 was Amaplast IR-1050™ (available from ColorChem, Atlanta, Ga.). The peak absorption wavelength for this dye is around 1050 nm. The nominal final zone extrusion temperature was about 280 degrees C. The masterbatch nominal dye concentration was 1.0 wt % dye in polymer.

TABLE F

Processing Conditions for Cast Web 4

| Conditions | Cast Web 4 |
|---|---|
| Material 1 | PEN |
| Material 2 | PENBB20 |
| Material 3 | PEN |
| Extruder 1 Final Temperature | 282 degrees C. |
| Extruder 2 Final Temperature | 275 degrees C. |
| Extruder 3 Final Temperature | 282 degrees C. |
| Melt Train Temperature | 285 degrees C. |
| Die Temperature | 279 degrees C. |
| Material 1 relative weight fed | 11 |
| Material 2 relative weight fed | 8 |
| Material 3 relative weight fed | 5 |
| Stream fed Masterbatch | Material 2 |
| weight % dye in Master batch | 1 |
| Masterbatch fraction of stream | 0.06 |
| Cast thickness, center (microns) | 400 |

Birefringent Multilayer Optical Film 7, Made Using Cast Web 4

The multilayer cast web was then drawn sequentially on a film line and wound into a continuous roll of film. The cast web was generally pre-heated, stretched in a Length Orienter (L.O.) along the machine direction (x direction) above the glass transition of the cast web materials to a draw ratio of about 3.8. The film was then preheated and drawn in the transverse direction (y direction) to a draw ratio of about 4.2 at 130 degrees C. in a conventional tenter. The final multilayer optical film, referred to herein as Multilayer Optical Film 7, was clear with a very slight gray hue and a thickness of approximately 25 microns.

The refractive indices of the outer skin layer of the Film 7 (composed of the oriented PEN material) were measured at 632.8 nm using a Prism Coupler available from Metricon (Piscataway, N.J.). For this film, the refractive indices of the interior PEN microlayers are substantially the same as the measured refractive indices of the outer PEN skin layers. The measured refractive indices nx, ny and nz of the PEN skin were 1.734, 1.752 and 1.497, respectively. Normally incident transmission variations over the inherent but inactive reflective band, relative to that measured due to surface reflections only (i.e. when no optical band is present) were under 10% for both principal, orthogonal states of polarization.

Patterned Film 4

Multilayer Optical Film 7 was then laser treated by selective exposure to the output of a pulsed fiber laser with a wavelength of 1062 nm (30 W HM series from SPI Lasers, Southampton, UK), to provide an internally patterned film referred to herein as Patterned Film 4. The laser pulse width was 65 nanoseconds at a pulse rate (repetition rate) of 75 kHz, and an average power of 4.4 watts. The output of the laser was fiber delivered to a hurrySCAN 25 galvanometer scanner (SCANLAB AG, Puccheim, Germany) and focused using an f-theta lens with a numerical aperture of 0.15 (Sill Optics GmbH, Wendelstein, Germany). In order to minimize laser damage to the films, the focal point of the f-theta lens was located approximately 0.5 mm above the surface of the samples. The laser beam was manipulated with the galvanometer scanner to produce 4 mm×4 mm squares of exposed lines on the samples at each laser condition, with individual scan lines separated by a distance of 30 microns. Scans at various rates between 170 and 360 were used. At intermediate scan rates (e.g. 170 to 280 mm/sec), the treated area was converted to a blue reflector which appeared yellow when viewed with transmitted light from the white background.

This disclosure encompasses multilayer optical films that contain at least one doubly birefringent microlayer stack suitable for processing, or that has been processed, in one or more processed zones in any desired pattern or design, the processed zones being characterized by a reduced birefringence of at least some of the microlayers that make up the stack, and a changed reflective characteristic associated with the reduced birefringence. The degree of processing, and/or the degree of birefringence reduction, may be the same in all processed areas, or it may be different. For example, the stack may have one or more first areas or zones with no processing, and with a first reflective characteristic associated with a first degree of birefringence. The stack may also have one or more second areas or zones with a second degree of processing, a second reflective characteristic, and a second degree of birefringence. The stack may further include one or more third areas or zones with a third degree of processing, a third reflective characteristic, and a third degree of birefringence, and so forth without limitation. The first, second, third, etc. zones or areas of the stack may be arranged in any desired manner.

The teachings of the present application can be used in combination with the teachings of any or all of the following commonly assigned applications, which are incorporated herein by reference: U.S. Provisional Application No. 61/139,736, "Internally Patterned Multilayer Optical Films Using Spatially Selective Birefringence Reduction", filed Dec. 22, 2008; U.S. Provisional Application No. 61/157,996, "Multilayer Optical Films Having Side-by-Side Mirror/Polarizer Zones", filed Mar. 6, 2009; and U.S. Provisional Application No. 61/158,006, "Multilayer Optical Films Suitable for Bi-Level Internal Patterning", filed Mar. 6, 2009.

The teachings of this application can be used in combination with the teachings of the following commonly assigned applications being filed on even date herewith: International Application No. PCT/US2009/069153, "Internally Patterned Multilayer Optical Films Using Spatially Selective Birefringence Reduction"; International Application No. PCT/US2009/069120, "Multilayer Optical Films Having Side-by-Side Mirror/Polarizer Zones"; International Application No. PCT/US2009/069173, "Multilayer Optical Films Suitable for Bi-Level Internal Patterning"; and International Application No. PCT/US2009/069192, "Multilayer Optical Films Having Side-by-Side Polarizer/Polarizer Zones".

Unless otherwise indicated, all numbers expressing quantities, measurement of properties and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the scope and spirit of this invention, and it should be understood that this invention is not limited to the illustrative embodiments set forth herein. All U.S. patents, published and unpublished patent applications, and other patent and non-patent documents referred to herein are incorporated by reference, to the extent they are not inconsistent with the foregoing disclosure.

The invention claimed is:

1. A multilayer optical film, comprising:
   a plurality of interior microlayers arranged to selectively reflect light by constructive or destructive interference, the microlayers extending from a first zone to a neighboring second zone of the film;
   wherein in the first zone the plurality of interior microlayers provides a first reflective characteristic and in the second zone the plurality of interior microlayers provides a second reflective characteristic different from the first reflective characteristic;
   wherein the plurality of interior microlayers comprises a first set of microlayers that are birefringent in the first zone and less birefringent or isotropic in the second zone, the first set of microlayers comprising a first material; and
   wherein the plurality of interior microlayers comprises a second set of microlayers that are birefringent in the first zone, the second set of microlayers comprising a second material different from the first material.

2. The film of claim 1, wherein the second set of microlayers substantially maintain their birefringence in the second zone.

3. The film of claim 1, wherein:
the plurality of interior microlayers are arranged in a stack that comprises optical repeat units; and
each of the optical repeat units comprises a first microlayer from the first set of microlayers and a second microlayer from the second set of microlayers.

4. The film of claim 1, wherein the film has a first thickness in the first zone and a second thickness in the second zone, and wherein the difference between the first and second reflective characteristics is not substantially attributable to any difference between the first and second thicknesses.

5. The film of claim 1, wherein in the first zone, the first set of microlayers have refractive indices all of which are substantially matched to corresponding refractive indices of the second set of microlayers.

6. The film of claim 1, wherein the first reflective characteristic is substantially a window characteristic, wherein the second reflective characteristic is substantially a mirror or polarizer characteristic.

7. A method of making a patterned multilayer optical film, comprising:
providing a multilayer optical film that comprises a plurality of interior microlayers extending from a first zone to a neighboring second zone of the film, the plurality of interior microlayers arranged to provide a first reflective characteristic associated with constructive or destructive interference of light in both the first and second zones, and wherein the plurality of interior microlayers includes a first set of microlayers comprising a first material and a second set of microlayers comprising a second material different from the first material, the first and second set of microlayers each being birefringent in the first and second zones; and
selectively heating the film in the second zone in an amount sufficient to cause at least the first set of microlayers to lose some or all of their birefringence in the second zone while maintaining a structural integrity of the plurality of interior microlayers in the second zone, the loss of birefringence producing a change from the first reflective characteristic to a different second characteristic in the second zone.

8. The method of claim 7, wherein the selective heating is carried out such that the second set of microlayers substantially maintain their birefringence in the second zone.

9. The method of claim 7, wherein the selective heating is carried out without any substantial reduction in thickness of the film in the second zone.

10. The method of claim 7, wherein after the selective heating is carried out the film has a first thickness in the first zone and a second thickness in the second zone, and wherein the difference between the first and second reflective characteristics is not substantially attributable to any difference between the first and second thicknesses.

11. The method of claim 7, wherein before the selective heating is initiated, the first set of microlayers have refractive indices all of which are substantially matched to corresponding refractive indices of the second set of microlayers in the first and second zones.

12. The method of claim 7, wherein the selective heating is carried out such that the first reflective characteristic is maintained in the first zone.

13. The method of claim 7, wherein the selective heating is carried out by irradiating the second zone with radiant energy emitted by a laser.

14. The method of claim 7, wherein the first reflective characteristic is substantially a window characteristic, and wherein the second reflective characteristic is substantially a mirror or polarizer characteristic.

15. The method of claim 7, wherein the first reflective characteristic is substantially a mirror or polarizer characteristic, and wherein the second reflective characteristic is substantially a window characteristic.

* * * * *